United States Patent

Inoue et al.

[11] Patent Number: 6,134,061
[45] Date of Patent: *Oct. 17, 2000

[54] DIGITAL SIGNAL RECORDING AND REPRODUCING APPARATUS AND DIGITAL SIGNAL RECORDING AND REPRODUCING METHOD COLLECTIVELY RECORDING INSPECTON CODES AND FORMING A GAP THEREBETWEEN DURING POST-SCORING

[75] Inventors: Tohru Inoue; Ken Onishi; Masaru Kawabata, all of Nagaokakyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/702,866

[22] Filed: Aug. 26, 1996

Related U.S. Application Data

[62] Division of application No. 08/348,974, Nov. 28, 1994, abandoned, which is a division of application No. 08/010,368, Jan. 28, 1993, Pat. No. 5,400,186.

[30] Foreign Application Priority Data

| Jan. 29, 1992 | [JP] | Japan | 4-13718 |
| Jan. 29, 1992 | [JP] | Japan | 4-13959 |
| Jan. 30, 1992 | [JP] | Japan | 4-15053 |
| Feb. 4, 1992 | [JP] | Japan | 4-18740 |

[51] Int. Cl.[7] .............. G11B 5/09; H04N 9/79; H03M 13/00
[52] U.S. Cl. ............. 360/48; 360/53; 386/40; 386/124; 714/755
[58] Field of Search ........... 360/19.1, 27, 38.1, 360/32, 51, 8, 13, 48, 18, 84; 386/100, 101, 103; 371/37.4; 714/755

[56] References Cited

U.S. PATENT DOCUMENTS

| 4,143,406 | 3/1979 | Tsuiki et al. | 360/48 |
| 4,222,079 | 9/1980 | Onishi et al. | 360/32 |
| 4,234,896 | 11/1980 | Onishi et al. | 360/32 |
| 4,356,517 | 10/1982 | Ozaki et al. | 360/13 |
| 4,364,096 | 12/1982 | Ozaki et al. | 360/13 |
| 4,423,441 | 12/1983 | Ozaki et al. | 360/13 |
| 4,549,229 | 10/1985 | Nakano et al. | 360/8 |
| 4,562,491 | 12/1985 | Kawabata et al. | 360/51 |
| 4,593,392 | 6/1986 | Kouyama | 360/38.1 X |
| 4,882,638 | 11/1989 | Onishi et al. | 360/32 |
| 5,012,361 | 4/1991 | Chiba et al. | 360/38.1 |
| 5,309,290 | 5/1994 | Sugiyama | 360/32 |
| 5,355,229 | 10/1994 | Arano et al. | 360/19.1 X |
| 5,369,641 | 11/1994 | Dodt et al. | 360/48 X |
| 5,371,750 | 12/1994 | Inoue et al. | 371/37.4 |
| 5,396,374 | 3/1995 | Kubota et al. | 360/27 |
| 5,416,651 | 5/1995 | Uetake et al. | 360/48 |
| 5,471,355 | 11/1995 | Ogata et al. | 360/84 |
| 5,574,570 | 11/1996 | Ohkuma et al. | 386/103 |

FOREIGN PATENT DOCUMENTS

| 0267029 | 5/1988 | European Pat. Off. . |
| 0437316 | 7/1991 | European Pat. Off. . |
| 0464698 | 1/1992 | European Pat. Off. . |
| 0498617 | 8/1992 | European Pat. Off. . |
| 4126480 | 4/1992 | Japan . |

*Primary Examiner*—Paul Loomis
*Assistant Examiner*—Regina Y. Neal

[57] ABSTRACT

A digital signal recording and reproducing method and apparatus for digitally recording and reproducing first and second signals in tracks on a magnetic recording includes an encoder and a recording unit. The encoder separately error-correcting encodes the first and second signals of a first and second type, respectively, to produce at least first and second inspection codes corresponding to the first and second signals. The first and second inspection codes have first and second lengths, respectively. The recording unit records the first and second signals and the first and second inspection codes in tracks of the magnetic recording medium so that the first and second signals and the first and second inspection codes are recorded in a track without a gap therebetween.

54 Claims, 21 Drawing Sheets

Fig. 4
Prior Art
D2 FORMAT
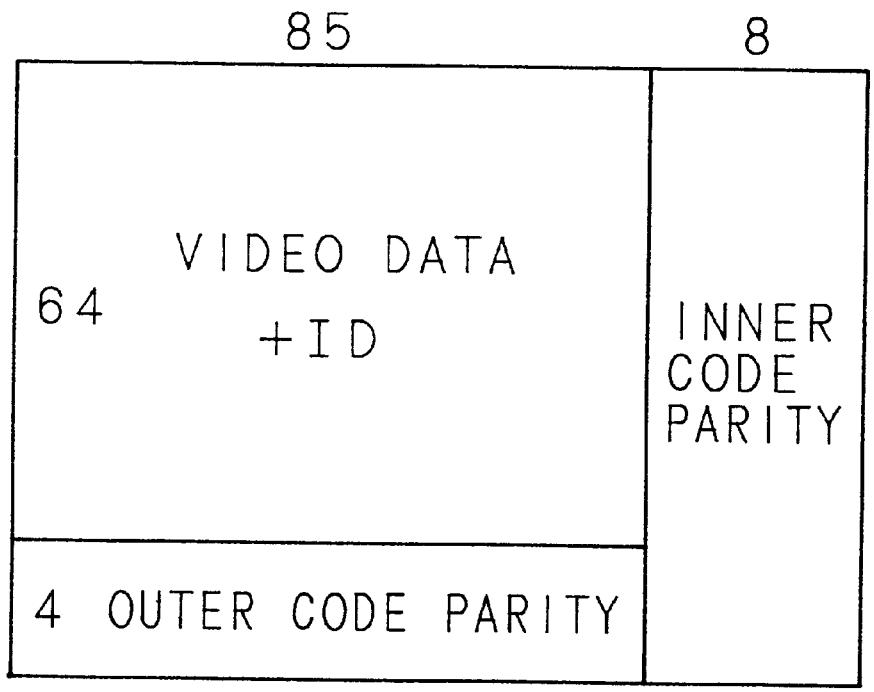
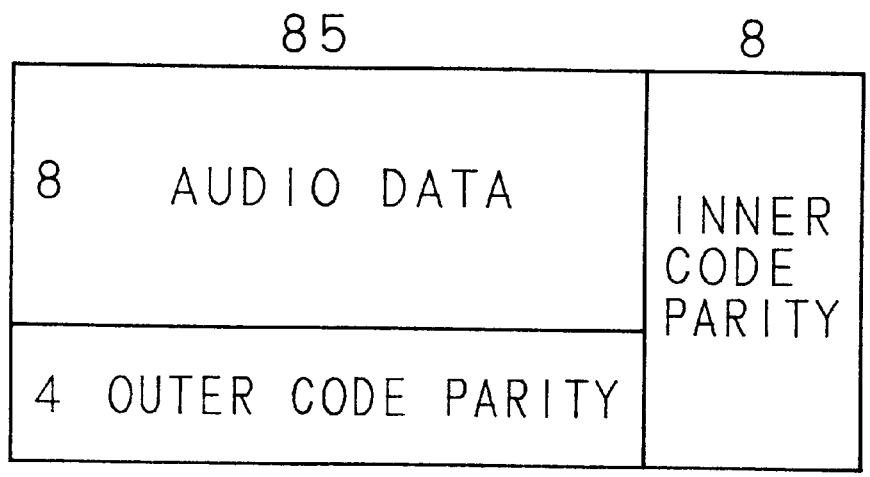

Fig. 9
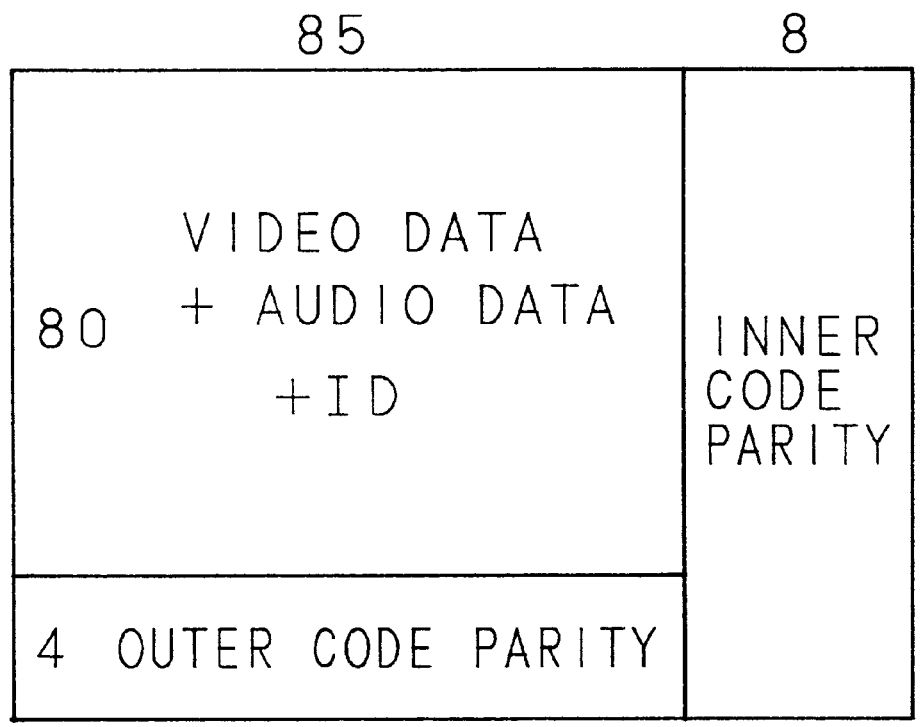
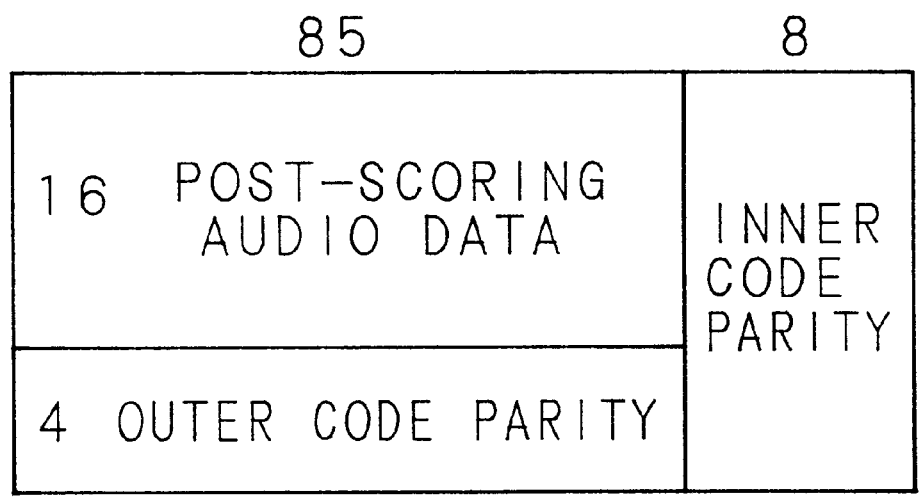

ERROR-CORRECTING CODE
DURING NORMAL RECORDING

ERROR-CORRECTING CODE
DURING REWRITING OF AUDIO SIGNAL

← GAP 3

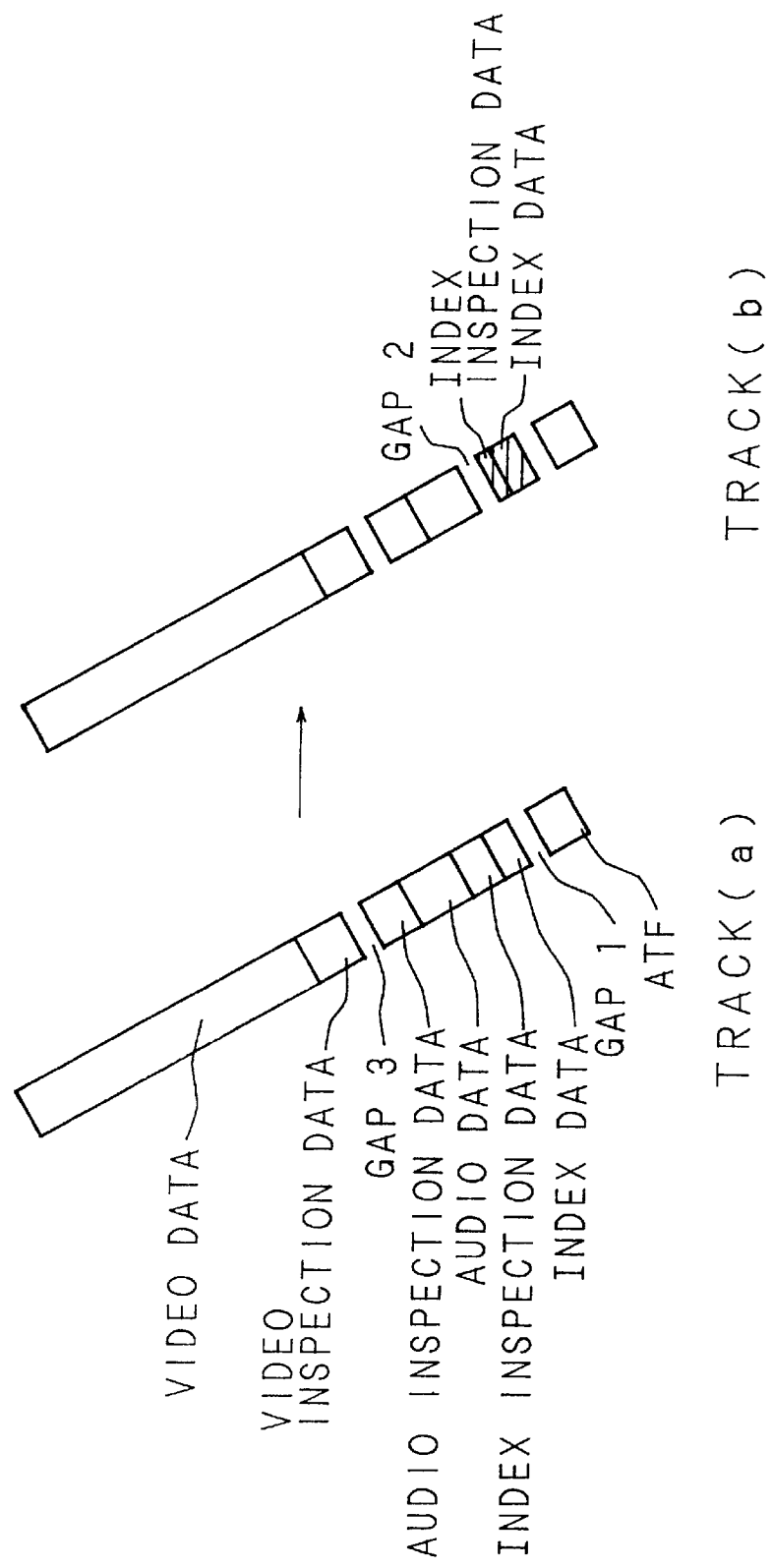

DIGITAL SIGNAL RECORDING AND REPRODUCING APPARATUS AND DIGITAL SIGNAL RECORDING AND REPRODUCING METHOD COLLECTIVELY RECORDING INSPECTON CODES AND FORMING A GAP THEREBETWEEN DURING POST-SCORING

This application is a divisional, of application Ser. No. 08/348,974 filed on Nov. 28, 1994, now abandoned, which is a Rule 60 divisional of Ser. No. 08/010,368, now U.S. Pat. No. 5,400,186 filed Jan. 28, 1993.

BACKGROUND OF THE INVENTION

1. Field of the Invention

This invention relates to a rotary head type digital signal recording and reproducing apparatus and to a digital signal recording and reproducing method for digitally recording the video and audio signals on a magnetic tape.

2. Description of Related Art

Conventionally, various systems of rotary head type digital signal recording and reproducing apparatus have been developed. As a typical example of such apparatuses, a digital VTR for broadcasting service known as D-2 system will be given an explanation hereinafter.

FIG. 1 is a schematic block diagram showing one example of D-2 system digital VTR. In the figure, numeral 101 is an input terminal for video signal, via which an analog video signal enters an A/D converter 103, which converts the signal to a digital signal and outputs it to a digital recording signal processor 105. On the other hand, numeral 102 is an input terminal for audio signal, via which an analog audio signal enters an A/D converter 104, which converts the signal to a digital signal and outputs it to the digital recording signal processor 105. The digital recording signal processor 105 carries out error-correction encoding, digital modulation, etc. and outputs the processed signal to recording AMPs 106, 107. The recording AMPs 106, 107 amplify input signals. The amplified signal is distributed to four recording and reproducing heads 112, 113, 114, and 115 via recording/reproducing selecting switches 108, 109 and via head selection switches 110, 111 and is recorded on a magnetic tape (not shown). Numerals 116–122 show components of reproducing part, and reproducing AMPs 116 and 117 amplify signals which are reproduced on recording and reproducing heads 112, 113, 114, 115 and are transferred through switches 110, 111 and through switches 108, 109, and then, output the amplified signal to a digital reproducing signal processor 118. The digital reproducing signal processor 118 carries out digital demodulation and error-correction decoding etc., and outputs video and audio signals of normal signal strings to D/A converters 119 and 120. The D/A converter 119 converts the input signal to the original analog video signal and outputs it via an output terminal 121. The D/A converter 120 converts the input signal to the original analog signal and outputs it via an output terminal 122.

FIG. 2 shows a tape format of D-2 system digital VTR. As shown in FIG. 2, in the D-2 system, a cue, time record, and control tracks are provided in the longitudinal direction of the magnetic tape. On the track tilted in the longitudinal direction of the magnetic tape, video and audio signals are digitally recorded. The audio signal is arranged in a total of four channels; the video signals is sandwitched by four channels with two channels on either side.

Referring now to FIG. 1, operations will be described in detail hereinafter. A composite video signal supplied to the input terminal 101 is sampled at quadruple subcarrier frequency (14.318 MHz) and is converted into the digital signal of 8 quantized bits (at the A/D converter 103). The audio signal supplied to the input terminal 102 is sampled at 48 kHz and is converted into the digital signal of 20 quantized bits (at the A/D converter 104). In the figure, for simplification, the audio signal input is represented by one channel but, in practice, four channel audio signal is supplied. The digitized video and four-channel audio signals are supplied to the digital recording signal processor 105. At the digital recording signal processor 105, the video and four-channel audio signals are time-base-processed and at the same time error-correcting codes are assigned to these signals in accordance with the format. The error-correcting codes are separately assigned to the respective video and four-channel audio signals. The digital recording signal processor 1005 further performs digital modulation processing in accordance with a specified modulation system. The output signal of digital recording signal processor 105 is distributed to the recording and reproducing heads 112, 113, 114, and 115, respectively, by the head selection switches 110 and 111 via recording AMPs 106, 107 as well as recording/reproducing selecting switches 108, 109, and is recorded on a magnetic tape in accordance with the tape format shown in FIG. 2. In this system, the data rate after the error-correcting code assigning is 127 Mbit/sec, and in terms of video signal, the data for 1 field is divided to be recorded in 6 tracks.

The recorded signal is reproduced as follows. The signal reproduced by the recording and reproducing heads 112, 113, 114, 115 enters to the digital reproducing signal processor 118 after being passed through head selection switches 110 and 111 as well as recording/reproducing selecting switches 108 an 109 and amplified by the reproducing AMPs 116, 117. The digital reproducing signal processor 118 performs digital demodulation and error-correction decoding and the signal is decoded into the normal video signal data string and the 4-channel audio signal data string to be outputted. The output signal of digital reproducing signal processor 118 is returned to the original video and 4-channel audio signals by the D/A converters 119, 120 and outputted via the output terminals 121, 122.

FIG. 3 shows a schematic block diagram showing another conventional configuration of D-2 system digital VTR. Numeral 201 in the figure is an A/D converter which converts analog video and 4-channel audio signals into digital signals, respectively. A video signal processor 202, first audio signal processor 203a, second audio signal processor 203b, third audio signal processor 203c, and fourth audio signal processor 203d sample an output, digital signal from each A/D converter 201 at a specified frequency and output it to corresponding first digital signal processor 204a and second digital signal processors 204b, 204b, 204b, 204b. Each of the digital signal processors 204a, 204b assigns error-correcting codes to the signal and then outputs it to a digital signal processor 206 via a switch 205. The digital signal processor 206 performs digital modulation processing on the input signal and then outputs the signal to a recording AMP 207. The recording AMP 207 amplifies the input signal. The amplified signal is recorded on a magnetic tape (not shown) by a recording and reproducing head 209 via a recording/reproducing selector switch 208. Numeral 210 is a reproduction unit which is so configured that the process is carried out in reverse sequence to that in the recording unit and therefore, the internal configuration of which is omitted.

Because the D-2 system is standardized as a digital VTR for broadcasting, azimuth recording is performed without a guard band between tracks in the D-2 format. As shown in FIG. 2, the audio signal, video signal, and audio signal are arranged in this order in the head scanning direction and the audio signal is arranged in two channels each on the either edges of the track, forming a total of four channels. In the D-2 composite system, one line of the video signal is made to contain 910 samples by sampling at 4 fsc, four times the subcarrier. After the 768 samples excluding the horizontal synchronizing signal are divided into two channels with vertical synchronizing signal being excluded, the samples in ⅓ of the field of 85 lines are collected and the order of 384×85×8 bit of data is rearranged by shuffling. An error-correcting code is assigned to the data and the data is recorded as a track pattern. FIG. 4 shows a format in which video signal area and audio signal area are error-correcting-encoded. The pixel data of one field is divided into three portions, separated into even numbered samples and odd numbered samples and recorded in separate tracks. One field consists of six tracks and the pattern format of each track is identical.

Now, referring to FIG. 3, operations are briefly explained. The audio signal supplied to the input terminal is converted into 20-bit digital signal by the A/D converter 201. Sampling is performed at 48 kHz. The error-correcting codes are assigned separately to video signal and audio signal at digital signal processors 204a, 204b, respectively. Further, at the digital signal processor 206, digital modulation processing is performed in accordance with a specified modulation format. Output of digital signal processor 206 is passed through the recording AMP 207 as well as recording/reproducing selector 208, distributed to the recording and reproducing head 209 by the head selection switch (not shown), and recorded on a magnetic tape in accordance with a tape format. In this system, the data rate, after an error-correction code is assigned, is 127 Mbit/sec and in terms of video signals, the data of 1 field is divided into 6 tracks to be recorded.

As described above, because in this format, the audio signal is separately recorded in individual four channels, editing can be performed independently for each channel. In order to perform editing independently for each channel, a track format in which the audio signal of one channel is recorded as one area, in short, area dividing type track format, is required. Then, a gap between the areas is also required. In addition, because the video and audio signals differ in the data rate, the video signal area is large, while the audio signal is smaller than the video signal area. Consequently, in order to give the audio signal area error correction (capability equivalent to that of the video signal area, for example, in the D-2 format audio code (12, 8, 5) Reed-Solomon code may he so arranged that the codes keep an equal distance with each other as in video C2 code (68, 64, 5) Reed-Solomon codes. Wherein, (n, k, d) represent the code length by n, information length by k, and the distance between codes by d. However, the equivalent error-correcting capability may be obtained but the encoding efficiency becomes extremely poor; 8/12 for audio signal against 64/68 for video signal.

Because the digital VTR for broadcasting apparatuses is configured as described above, it has appropriate qualities for business use such as high reliability, high picture quality, high sound quality, and highly sophisticated editing. Yet, on the other hand, because it employs an area dividing type format as described above, a gaps must be provided and in addition, when the equal error correcting capabilities are given to both video and audio signals, the encoding efficiency of audio signal decreases. In home digital VTR, compactness and user-friendliness are strongly required as is the case with presently available VTR's equipped with a camera in the market.

SUMMARY OF THE INVENTION

One object of the present invention is to provide a digital signal recording and reproducing apparatus (digital VTR) which achieves excellent encoding efficiency and can perform audio signal editing.

Another object of the present invention is to provide a digital signal recording and reproducing apparatus (digital VTR) which achieves compactness suited for domestic use as well and is easy to operate.

In the digital signal recording and reproducing apparatus according to the first, invention, video and audio signals are integrated arid an error-correcting codes is assigned to them collectively when video and audio signals are digitally recorded in tracks on a magnetic tape.

According to the first invention, the digitized video and audio signals which are separately arranged in one track are integrated and error-correcting codes are assigned to the integrated data. Thus, error-correction-encoding is effected. This process improves encoding efficiency of audio signal, gives equal error-correcting capabilities to video and audio signals, and makes it possible to form a more compact system.

In the digital signal recording and reproducing apparatus according to the second invention, at least one track is designated as an exclusive track for post scoring when video and audio signals of one frame are divided to be recorded in plurality of tracks. Because at least one track is set exclusively for post-scoring in addition to tracks in which video and audio signals are recorded during normal recording, the error-correcting code for the post-scoring signal achieves the equivalent level to those for other tracks, (and obtains the equivalent error correcting capability,) improving the encoding efficiency as well as making post-scoring editing possible. Even if post-scoring audio recording is repeated many times, the audio signal recorded during normal recording is not erased and thus, operational capability during post-scoring audio recording is improved.

In the digital signal recording and reproducing apparatus according to the third invention, a part of video signal extracted in the second invention is recorded in the track designated for post-scoring during normal recording. Consequently, because a part of video signal can be recorded in an area different from the area where video signal is normally recorded, video signal of better picture quality can be recorded and reproduced.

In the digital signal recording and reproducing method of the fourth invention, video and audio signals which are divided and arranged in one track are integrated an error-correcting code is assigned to this integrated data. Referring to one track, there are only two recording areas, permitting only one place to provide a gap; this improves the recording efficiency. When the number of audio channels is further increased for recording, error-correction codes are assigned to another area to carry out recording. Thus, encoding efficiency of audio signal is further improved, the error-correction capabilities for video and audio signals are brought to the equal level, thereby making it possible to form a more compact system.

In the digital signal recording anti reproducing method of the fifth invention, post-scoring audio signal is recorded in an area different from the main video recording area after an error-correcting codes is assigned. The error-correcting code of post-scoring audio signal becomes equal to that of the main recording area and the encoding efficiency can be improved with the error-correcting capabilities being brought to the equivalent level, and at, the same time post-scoring editing is made possible. Even if post-scoring audio recording fails, the audio signal recorded during normal recording is not erased, improving, operational capability post-scoring audio recording.

The digital signal recording and reproducing method according to the sixth invention, concerns the normal recording at the fifth invention, wherein a part of the extracted video signal is recorded in an area different from the main video recording area. Since a part of video signal is recorded in an area different, from the main video recording area. Since a part of video signal is recorded in an area different from an area where video signal is normally recorded, video signal of higher picture quality can be recorded and reproduced.

In the digital signal recording and reproducing method of the seventh invention, first and second signal are error-correcting-encoded respectively, and the inspection codes are recorded in the tracks in a lump. A gap between first and second signals in the track is no longer needed and the encoding efficiency is improved.

In The digital signal recording and reproducing method of the eighth invention, error-correcting-encoded audio signal is recorded in the second sign the track in which the second signal is recorded when the second signal is rewritten in the seventh invention. Therefore, it is possible to perform rewriting without changing error-correcting capability for the second signal.

In the digital signal recording and reproducing method of the ninth invention, first and second signals are separately error-correcting-encoded and recorded in tracks, and code length of the error-correcting code for the signal to be rewritten is changed when first or second signals are rewritten. Consequently, it, is possible to adjust the error-correcting capability of the signal to be rewritten.

In the digital signal recording and reproducing method according to the tenth stage of the invention, the code length of error-correcting code for the signal to be rewritten in the ninth invention is shortened. Consequently, the signal which is not rewritten can be stored, being kept intact.

In the digital signal recording and reproducing method of the eleventh invention, the first and second signals in the seventh, eighth, and ninth inventions are a video signal and an audio signal, respectively. The portion corresponding to the gap is assigned to the error-correcting code for the audio signal to improve the error-correcting capability of the audio signal.

In the digital signal recording and reproducing method of the twelfth invention, the first and second signals in the seventh, eighth and ninth embodiment are an audio signal and a subcode signal, respectively. The portion corresponding to the gap is assigned to the error-correcting code for the subcode signal to improve the error-correcting capability of the subcode signal.

In the digital signal recording and reproducing method of the thirteenth invention, during normal recording, video and audio signals are independently error-correcting-encoded, and are recorded in a track with a gap being set in it. When post-scoring audio recording is performed, audio and INDEX signals are error-correcting-encoded in a lump and are recorded in a track. In this configuration, a gap between audio and INDEX signals is no longer needed and the encoding efficiency is improved.

In the digital signal recording and reproducing method of the fourteenth invention during normal recording video and audio signals are error-correcting-encoded in a lump and recorded in a track, and when audio and INDEX signals are rewritten during post-scoring sound recording the audio and INDEX signals to be rewritten are error-correcting-encoded in a lump and recorded in a track. In this configuration, the signal can be rewritten without deteriorating the error-correcting capabilities of the portion to be rewritten and without increasing redundancy.

The above and further objects and features of the invention will more fully be apparent from the following detailed description with accompanying drawings.

BRIEF DESCRIPTION OF THE DRAWINGS

FIG. 4 is a diagram showing an error-correcting code format of a conventional D-2 system digital VTR.

FIG. 9 is a diagram showing an error-correcting code format of a digital VTR according to the present invention.

FIG. 13 is a diagram showing still another tape format of a digital VTR according to the present invention.

DESCRIPTION OF THE PREFERRED EMBODIMENTS

Figure 1:
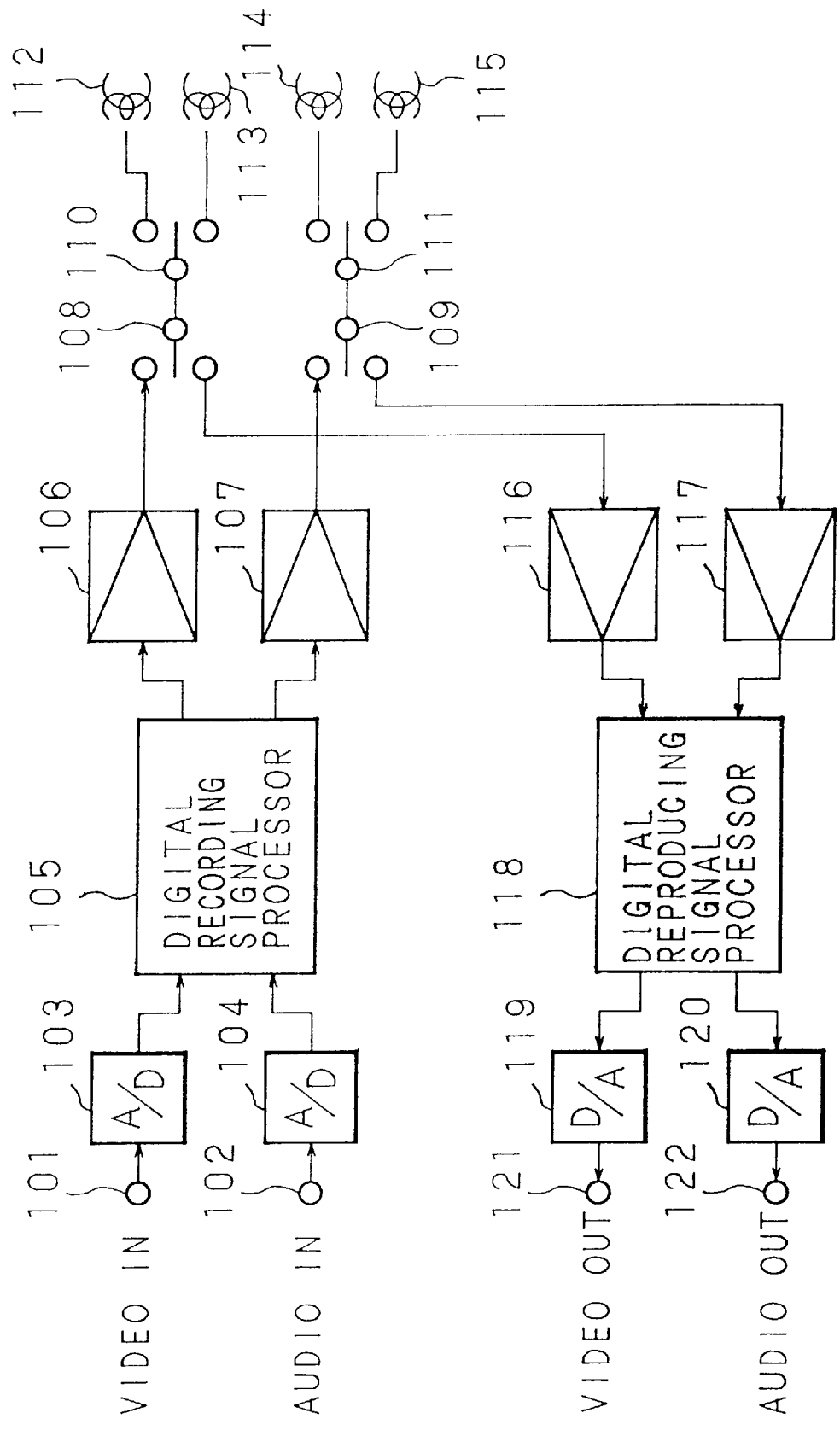
FIG. 1 is a schematic block diagram showing the configuration of a conventional D-2 system digital VTR.
Figure 2:
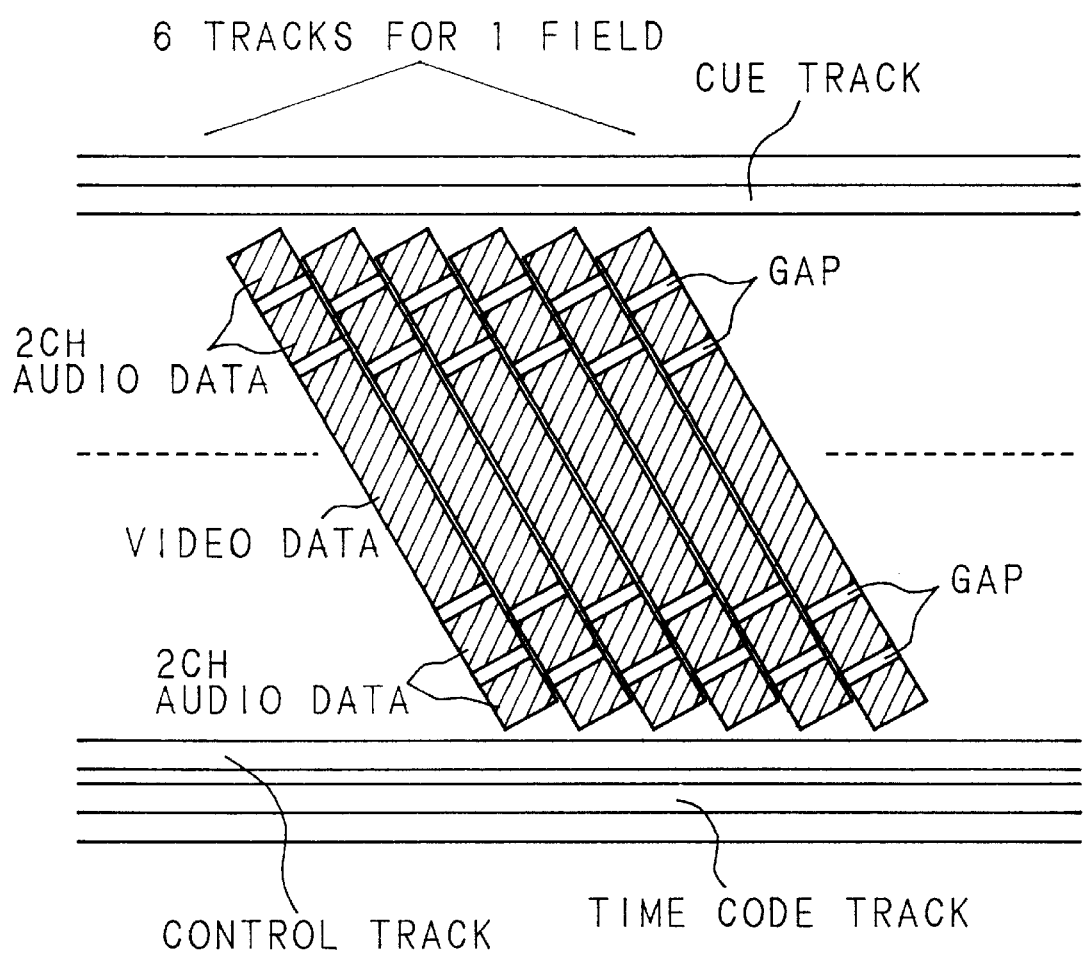
FIG. 2 is a diagram showing a tape format of a conventional D-2 system digital VTR.
Figure 3:
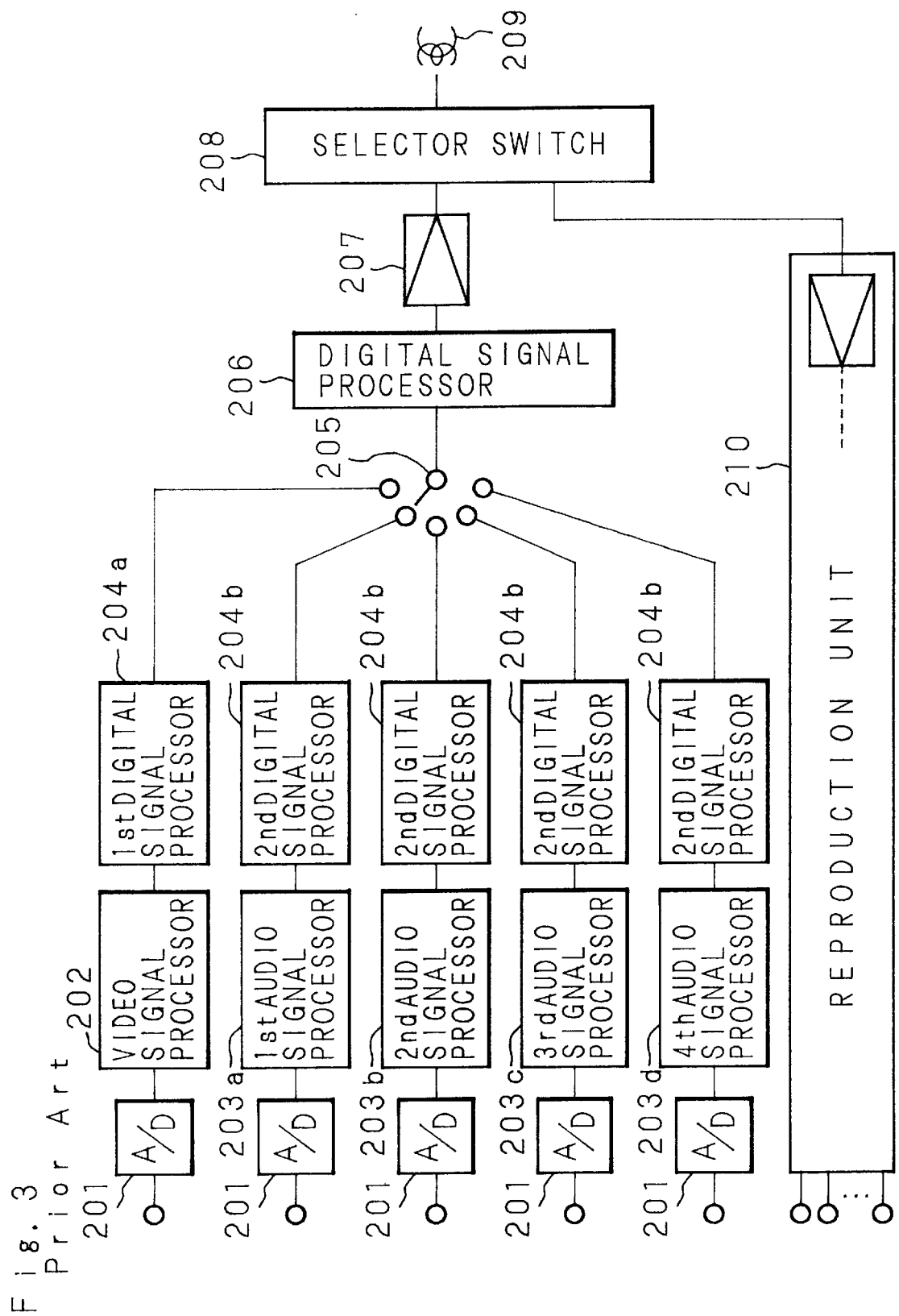
FIG. 3 is a schematic block diagram showing the configuration of another conventional D-2 system digital VTR.

Referring to the drawings, embodiments of the present invention will be described in detail hereinafter.

(First Embodiment)

Figure 5:
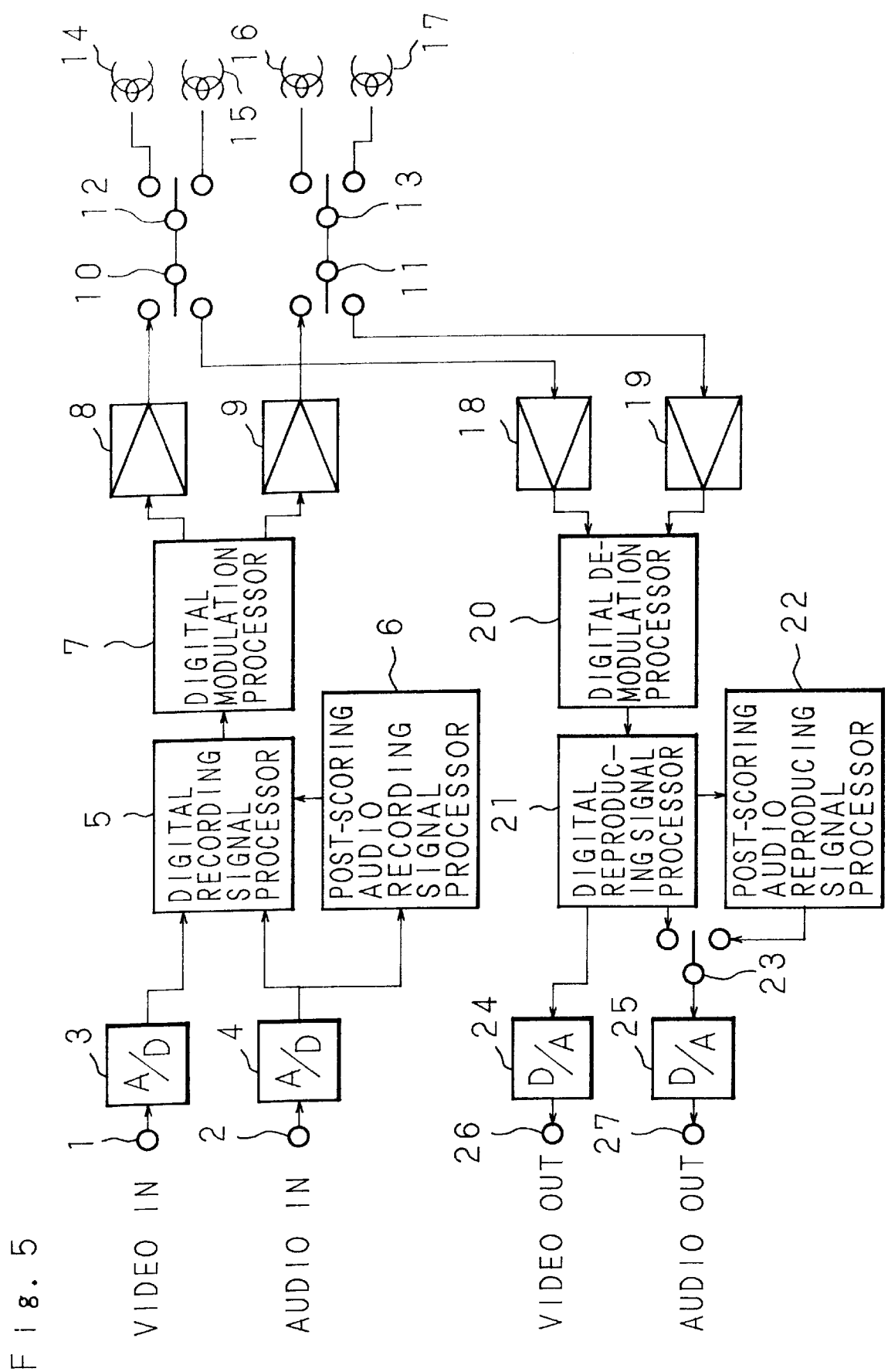
FIG. 5 is a schematic block diagram showing a configuration in an embodiment of a digital VTR according to the present invention.

FIG. 5 is a schematic block diagram showing an embodiment of home digital VTR according to the present invention. In FIG. 5, numeral 1 is an input terminal for a video signal, and via the input terminal 1, the analog video signal is supplied to an A/D converter 3, and the A/D converter 3 converts the signal to a digital signal and outputs the signal to a digital recording signal processor 5. On the other hand, numeral 2 is an input terminal for an audio signal, and via the input terminal 2, the analog audio signal is supplied to an A/D converter 4, and the A/D converter 4 converts the signal to a digital signal and outputs the signal to the digital recording signal processor 5 and a post-scoring audio recording signal processor 6. The post-scoring audio recording signal processor 6 sends dummy data to the digital recording signal processor 5 during normal recording and the audio signal for post-scoring to the digital recording signal processor 5 during post-scoring audio recording. The digital recording signal processor 5 assigns error-correcting codes to the video and audio signals in a lump and outputs the error-correcting-encoded signal to a digital modulation processor 7. The digital recording signal processor 5 separately extracts high-frequency components from the input video signal using, for example, a band limiting filter. The digital modulation processor 7 performs digital modulation and other processing and outputs the processed signal to recording AMP's 8, 9. The recording AMP's 8, 9 amplify the input signal. The amplified signal is distributed to four recording and reproducing heads 14, 15, 16, 17 via recording/reproducing selector switches 10, 11 and via head selector switches 12, 13, and is recorded on a magnetic tape (not shown). Numerals 18–27 show components of the reproduction unit and reproducing AMPs 18, 19 amplify the reproduced signal which is reproduced by recording and reproducing heads 14, 15, 16, 17 and is supplied via switches 12, 13 and 10, 11, and output the amplified signals to a digital demodulation processor 20. The digital demodulation processor 20 performs digital demodulation and other processings and outputs the processed signal to a digital reproducing signal processor 21. The digital reproducing signal processor 21 performs processings such as error-correcting-encoding and outputs the video signal of the normal signal string to a D/A converter 24, while it outputs the audio signal to a D/A converter 25 via a post-scoring selector switch 23 luring normal recording and via the post-scoring audio reproducing signal processor 22 and the post-scoring audio selector switch 23 during post-scoring audio recording. The D/A converter 24 converts the input signal to the original analog video signal and outputs it via an output terminal 26. The D/A converter 25 converts the input signal to the original analog audio signal and outputs it via an output terminal 27.

Figure 6:
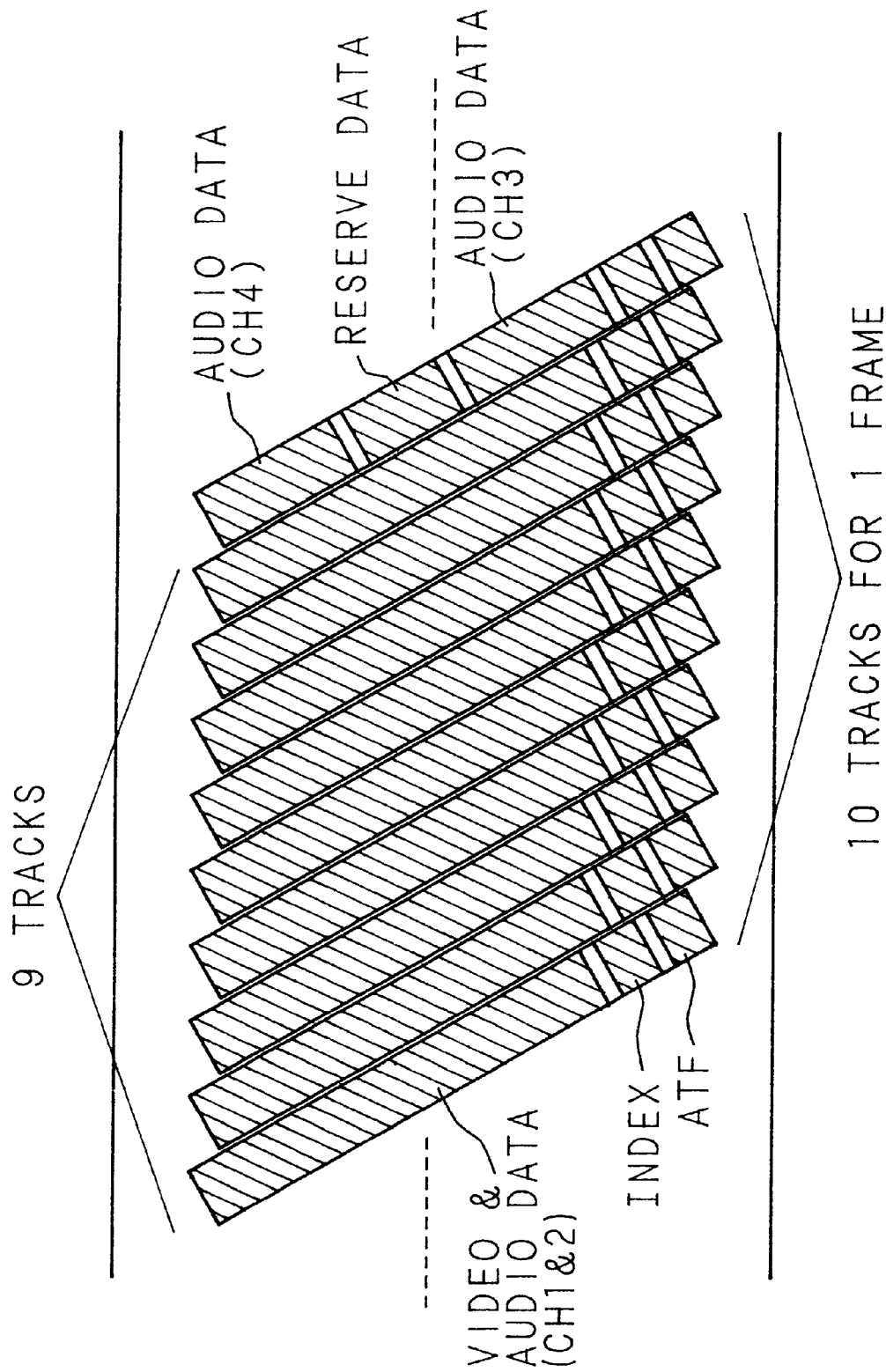
FIG. 6 is a diagram showing a tape format of a digital VTR according to the present invention.

FIG. 6 shows an example of a tape format of a digital VTR according to the present invention. As shown in FIG. 6, in the system according to the present, invention, the video signal and the four-channel audio signal are digitally recorded in a track tilted in the longitudinal direction of a magnetic tape in the same manner as in the conventional case, but in the present system, 10 tracks are provided for the time required for one frame of video signal, the video signal and the two-channel audio signal are divided and arranged in the nine tracks, and in the remaining one track, the two-channel audio signal and a reserve signal (hereinafter called "reserve data") are arranged to be recorded. An area designated for recording of control signal for tape feed (hereinafter called "ATF signal") and TNDEX signal is set in each track.

Now referring to FIG. 5, operations will be described. First, operations in normal recording is described. The composite signal supplied to the input terminal 1 is quantized to 8-bit digital signal at quadruple subcarrier frequencies (14.318 MHz) at, the A/D converter 3. The audio signal supplied to the input terminal 2 is quantized to 16-bit digital signal at 48 kHz at, the A/D converter 4. In FIG. 5, the audio signal input is shown in one channel for simplification but, in practice, there are two-channel audio inputs. The video signal and 2-channel audio signal which are digitized are supplied to the digital form are supplied to the digital recording signal processor 5.

On the other hand, at the post-scoring audio recording signal processor 6, dummy data is formed and is sent to the digital recording signal processor 5 as normal recording is performed.

At the digital recording signal processor 5, the video signal is image-compressed to reduce the data rate of video signal and necessary time-base processing is performed on image-compressed video signal and 2-channel audio signal, which then are divided and arranged in the designated nine tracks of the ten tracks per one frame. To the remaining one track, the dummy data input through the post-scoring audio recording signal processor 6 or data of gh-frequency components extracted from the above-mentioned video signal at the digital recording signal processor 5 is arranged. By the way, whether to arrange the dummy data input, through the post-scoring audio recording signal processor 6 or the data of high-frequency component extracted from the above-mentioned video signal to the remaining one track is decided by the image quality selector key (not shown) and the information about which signal is arranged is recorded with the INDEX signal flag. In addition, an error-correcting code is assigned to each track. The data string to which the error-correcting code is assigned is sent out to the digital modulation processor 7.

By integrating video and audio signals during normal recording as described above and performing error-correcting-encoding in which the error-correcting codes is assigned to the overall integrated data simultaneously, it is possible to form codes with better encoding efficiency and higher correcting capability compared to the conventional process in which the error-correcting code is assigned separately to video and audio signals. Particularly, since the video signal has larger volume of data than audio signal, this configuration is extremely effective for the audio signal.

At the digital modulation processor 7, the INDEX signal is assigned to each track of the data string sent out from the digital recording signal processor 5, while digital modulation is performed in accordance with a specified modulation system. In addition, to each track of the digital-modulated data string, the AFT signal is assigned.

The output signal of the digital modulation processor 7 is passed through recording AMPs 8, 9, distributed to recording and reproducing heads 14, 15, 16, 17, respectively, by head selector switches 12, 13 and recording/reproducing selector switches 10, 11, and are recorded on a magnetic tape in accordance with the tape format shown in FIG. 6.

Signal reproduction is performed as follows. The signal reproduced by recording and reproducing heads 14, 15, 16, 17 is passed through head selector switches 12, 13 and through recording/reproducing switches 10, 11, amplified at, reproducing AMPs is, 19, and then, supplied to the digital demodulation processor 20. At the digital demodulation processor 20, the ATF signal is extracted from each track and sent out to the servo circuit (not shown) while the data string of each track is digital-demodulated. The digitally demodulated data string is sent to the digital reproducing signal processor 21.

At the digital reproducing signal processor 21, error-correcting processing is performed on the digital-demodulated data string to be entered. In addition, the video signal and 2-channel audio signal are extracted from designated nine tracks out of a 10-track unit, and at the same time, when the INDEX signal indicates that post-scoring audio data is recorded, the data of the remaining one track of a 10-track unit is sent out to post-scoring audio reproducing signal processor 22. The extracted video signal is restored to the original video signal by compression-restoration processing. When the INDEX signal indicated high-frequency component data of video signal is recorded, the data of the remaining one track of a 10-track unit and this compression-restored video data are added to restore the original video signal. The extracted 2-channel audio signal is restored to the original 2-channel audio signal by a specified time-base processing.

As described above, by recording high-frequency component data, which is a part of video signal, in other recording area than that for normal video signal, higher image-quality video signal can be reproduced.

At the post-scoring audio reproducing signal processor 22, the input data from the digital reproducing signal processor 21 is identified as dummy data. This identification process can determine that there is no audio data for post-scoring in this track. The configuration is designed to allow the post-scoring audio selector switch 23 to constantly select audio data from the digital reproducing signal processor 21 by this judgment. Thus, consideration is given so that users can select and listen to post-scored sound by post-scoring audio selector key (not shown) and that, if post-scoring sound is not recorded even when users select post-scoring sound, normal sound is outputted automatically. If any post-scoring audio signal is recorded on a magnetic tape, the input data from the digital reproducing signal processor 21 contains 2-channel audio signals for post-scoring, Therefore, time-base processing is carried out at this post-scoring audio reproducing signal processor 22 and the audio signal is restored to the original 2-channel audio signal for post-scoring to be sent out. It is also possible to decide whether any post,-scoring audio signal is recorded or not, by setting a flag in INDEX signal.

The video signal sent out, from is digital reproducing signal processor 21 is D/A-converted by the D/A converter 24 to the original video signal. If no post-scoring sound is selected by users using the post-scoring audio selector key, the 2-channel audio signal sent out from the digital reproducing signal processor 21 is D/A converted by the D/A converter 25 via post-scoring audio selector switch 23 and the original 2-channel audio signals is reproduced. If users select post-scoring sound by the post-scoring audio selector key and the 2-channel audio signal for post-scoring is reproduced, the 2-channel audio signal for past-scoring sent out from the post-scoring audio reproducing signal processor 22 is D/A-converted by the D/A converter 25 via post-scoring audio selector switch 23 and the original 2-channel audio signal for post-scoring can be obtained. Though it is not, shown in the figure, the configuration is so designed that if no reproduced outputs are obtained from reproducing AMPs 18, 19, the output, video and audio signals are muted.

Next, operation in post-scoring audio recording will be described. By operating a post-scoring recording key (not, shown), post-scoring recording mode is obtained. By operating a reproducing key (not shown) at a post-scoring recording mode, post-scoring audio recording starts after a specific time. At post-scoring recording mode, at the post-scoring audio recording processor 6, input two-channel audio signal is time-base-processed arid is divided and arranged in designated track of a track array of 10 tracks. This data is sent to the digital recording signal processor 5.

By operating the reproducing key, a magnetic tape begins running. Running of a magnetic tape is controlled, using the ATF signal reproduced from each track. Video and 2-channel audio signals reproduced from designated nine tracks of a track array of 10 tracks are signal-processed in the same manner as in normal reproduction and the reproduced video signal is outputted through the output, terminal 26. After the reproducing key is operated, post-scoring audio recording is resumed from a specified position of a magnetic tape.

The two-channel audio signal for post-scoring sent, out from the post-scoring audio recording processor 6 is signal processed as in normal recording at the digital recording signal processor 5 and digital modulation processor 7 and is supplied to the recording AMP 9. The two-channel audio signal is overwritten to be recorded in a designated track of a track array of 10 tracks on a magnetic tape by changing over properly either recording/reproducing selector switch 11 and head selector switch 13. Thus, post-scoring audio When DCT (Discrete Cosine Transform) encoding is used as image compressing system to reduce video data rate to about 25 Mbps, and when a system in which the error-correcting code is assigned independently to the video signal and two-channel audio signal, as in a conventional system, is employed, recording data rate after error-correcting code assigning reaches about 38 Mbps. On the other hand, according to the system in the first embodiment, recording data rate of about 38 Mbps, the similar level that can be achieved with the conventional system, can be achieved even when video and two-channel audio signals during normal recording are integrated with the error-correcting code assigned to them, and then, the two-channel audio signal for post-scoring, which is integrated with the reserve signal with the error-correcting code assigned to them are added.

Unlike apparatuses for business use, in apparatuses for private use, user-friendliness is essential. Consequently, audio signal is not necessarily recorded and reproduced channel by channel and may be recorded and reproduced by the unit of two channels.

In this embodiment, video and audio signals for one frame are divided and arranged in a track array of 10 tracks but video and audio signal for one frame may be divided and arranged in a track array of N tracks (N represents a positive integer) depending on the type of input video signal (for example, NTSC, PAL, etc. ) or electromagnetic performance of magnetic tape and magnetic head.

In this embodiment, one track out of a track array of 10 tracks is designated as at track exclusively for post-scoring but, plurality of tracks may be designated.

According to this first embodiment, since during normal recoding, thief video signal is recorded together with the two-channel audio signal and during post-scoring audio recording, the two-channel audio signal is recorded in a track designated for post-scoring audio recording, even if users fail in post-scoring audio recording, the two-channel audio signal recorded during normal recording is not erased, allowing users to repeat post-scoring audio recording over and over, a system friendly to users can be constructed.
(Second Embodiment)

Figure 7:
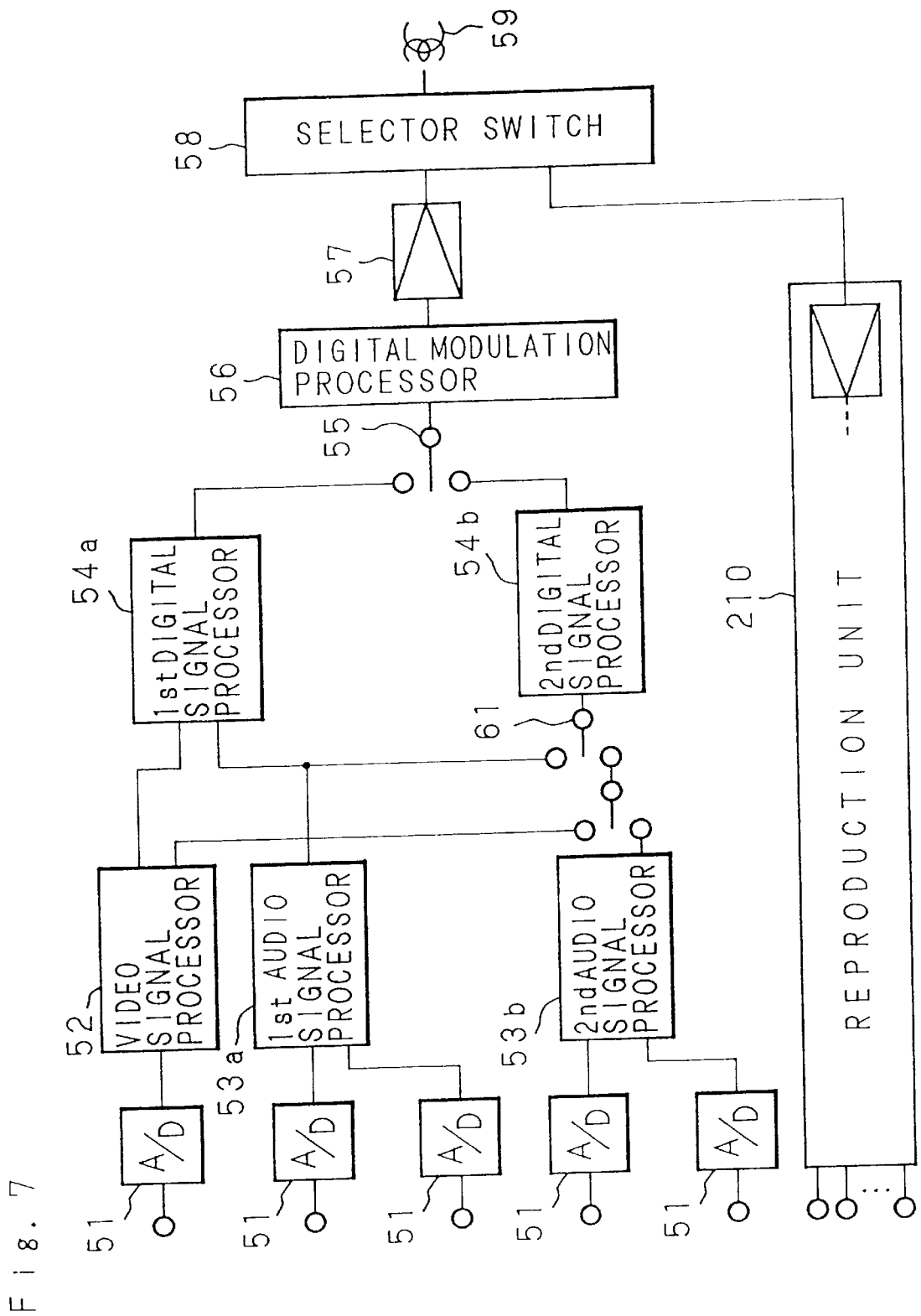
FIG. 7 is a schematic block diagram showing a configuration in another embodiment of a digital VTR according to the present invention.
Figure 8:
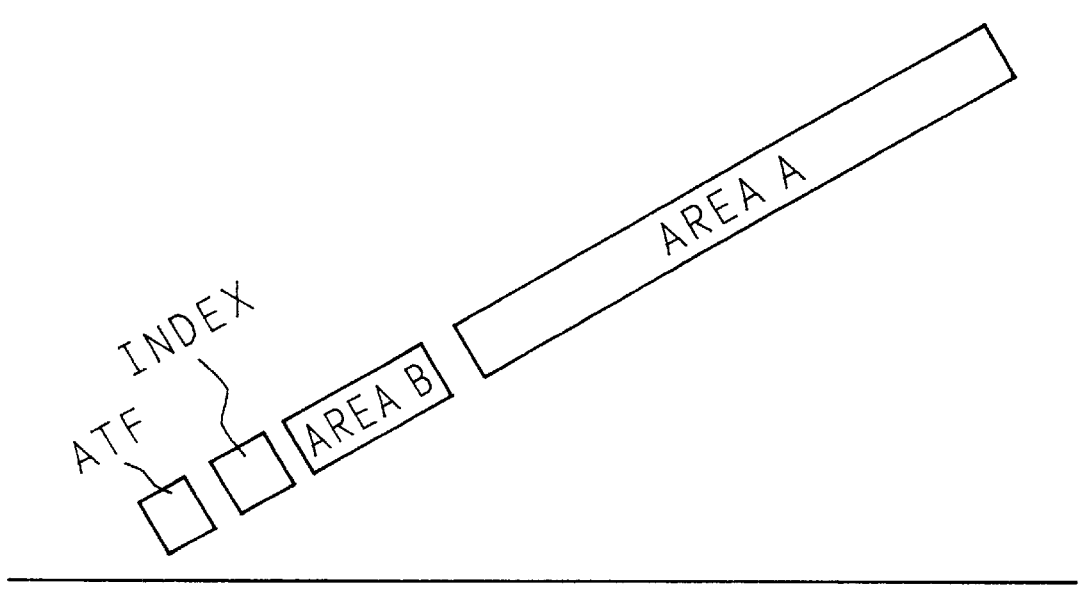
FIG. 8 is a diagram showing another tape format of a digital VTR according to the present invention.

FIG. 7 is a schematic block diagram showing another configuration of at home digital VTR according to the present invention, while FIG. 8 is a diagram showing a tape format in accordance with the embodiment. First of all, during normal recording of video/audio signals, the video signal is supplied to a video signal processor 52 via an A/D converter 51, sampled at 4 fsc, time-base-processed, data-compressed by DCT if compression is needed, and then, outputted two a first digital signal processor 54a. In the meantime, the audio signal passed through an A/D converter 51 is sampled and digitized at, a first audio signal processor 53a and out-putted to the first, digital signal processor 54a. At the first digital signal processor 54a, the video and audio signals are integrated and the error-correcting code is assigned to them collectively. The error-correcting-encoded data is recorded as magnetized pattern in area A on a magnetic tape shown in FIG. 8 by a recordings and reproducing head 59 via a switch 55, a digital modulation processor 56, a recording AMP 57, and a recording/reproducing selector switch 58. In the remaining area B, dummy data supplied from a second audio signal processor 53b or high-frequency component data extracted from the above-mentioned video signal and supplied from the video signal processor 52 is sent from the second digital signal processor 54b to be recorded.

On the other hand, during post-scoring audio recording, the two-channel audio signals for post-scoring passed through an A/D converter 51 pass the second audio signal processor 53b and are error-correcting-encoded by the second digital signal processor 54b. The error-correcting-encoded data is recorded as magnetized pattern in area B on a magnetic tape shown in FIG. 8 by recording and reproducing head 59 as in normal recording.

Other details of the operation-during recording are same as those described in the above first embodiment, and therefore, the description is omitted. In reproducing operation, the process takes steps reversal to those in recording, and therefore, the description is also omitted.

In the format, shown in FIG. 8, the video and four-channel audio signals are digitally recorded in a track tilted in the longitudinal direction of a magnetic tape as in conventional embodiments. In area A, the video and two-channel audio signals are divided and arranged, while in area B, the two-channel audio signal and reserve data are arranged and recorded. The area designated for recording of ATF and INDEX signals are set in each track. Because video and audio signals can be error-correcting-encoded in a lump during normal recording, highly efficient code correction is achieved. A gap used for recording video and audio signals separately is no longer needed. In addition, it has an advantage that post-scoring area can be freely used for signals other than post-scoring audio signal due to this format.

FIG. 9 shows a format, in which video and audio data are error-correcting encoded according to the second embodiment and a format in which post-scoring audio data is error-correcting-encoded, respectively. As the comparison with the conventional method illustrated in FIG. 4, in the information area consists of D-2 format video and audio data the data volume amounts to 85×64+85×8×4=8160 bytes and in the overall format in which these data are encoded the data volume amounts to 93×68+93×12×4=10788 bytes. On the other hand according to the embodiment shown in FIG. 8, the information area consists of the same number of bytes, with 85×80+85×16=8160 bytes, but the total of the encoded data amounts to 93×84+93×20=9672 bytes, which is 1116 bytes less than that of the conventional system. The random error-correcting capabilities may be the same because the synthetic distance is 9×5=45 for both cases if Reed-Solomon code on GF ($2^8$) is used. The burst correcting capabilities are equal also. Consequently, the present, invention is superior in nearly identical correcting capability can be obtained with less redundancy.

In this embodiment, a single area B in the track is designated as an exclusive area for post-scoring but plurality of areas may be provided for the purpose.

As described above, in this second embodiment, video and audio signals are error-correcting-encoded in a lump, and are recorded in a fixed area on a track while the post-scoring audio signal is error-correcting-encoded separately and is recorded in a different area on the track. Therefore, only one place is required to provide a lap clearance compared to the conventional system, a system with high error-correcting encoding efficiency, less possibility of post-scoring recording failure, and higher efficiency can be constructed.

A track designated for post-scoring and an area B designated for post-scoring in the first and the second embodiments can be used for various applications including, for example, recording a high-quality still image signal as shown, in the Japanese Patent Application No. Y-2-48465 "Animation/still Picture Simultaneous Recording and Reproducing Apparatus."

Next, another embodiment of the present invention will be explained below. The configuration of the digital VTR in each embodiment shown below is the same as FIG. 5 (first embodiment).
(Third Embodiment)

Figure 10:
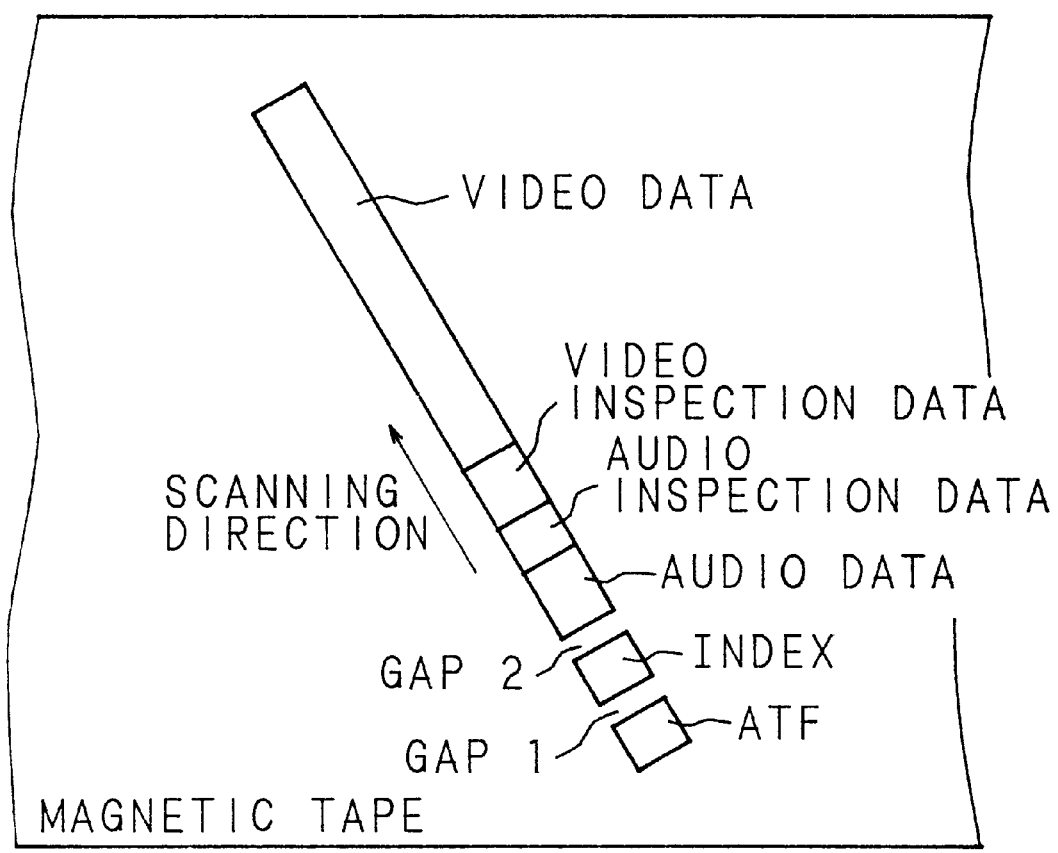
FIG. 10 is a diagram showing still another tape format of a digital VTR according to the present invention.

FIG. 10 is a diagram showing a tape format according to the third embodiment. In the system according to thief third embodiment as shown in FIG. 10, three areas are provided so that ATF signal, special recording area signal of INDEX signal (example of subcode signal), video signal and two-channel audio signal are digitally recorded sequentially in the head scanning direction. Between thee ATF and INDEX areas and the INDEX and the video +audio areas, a gap is provided, respectively.

In the digital recording signal processor 5, as described above, the video signal is image-compressed, and necessary time-base processing is performed on the image-compressed video signal and the two-channel audio signal. Then, the signals are divided and arranged, for example, in ten tracks per one frame. And error-correcting encoding is performed in each track but encoding is performed on video, audio, and INDEX signals, separately. Then, data such as the signal for retrieval and the number of channels of audio signal is recorded in the INDEX signal. The data string to which the error-correcting code is assigned is sent out to the digital modulation processor 7. At the digital modulation processor 7, the ATF signal is added to each track of the data string sent from the digital recording signal processor 5 and digital modulation is performed in accordance with a specified modulation system. The ATF signal may he added after modulation is carried out.

Figure 12A:
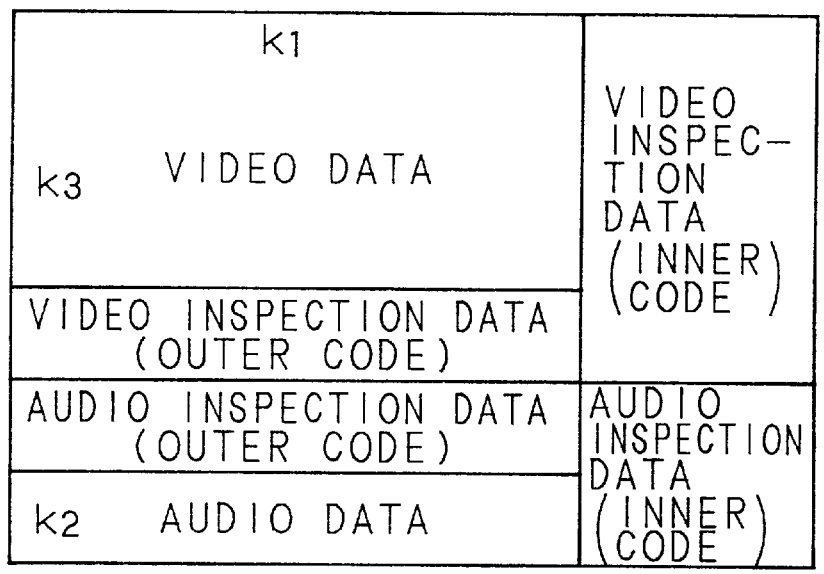
FIG. 12 is a diagram showing another error-correcting code format of a digital VTR according to the present invention.
Figure 12B:
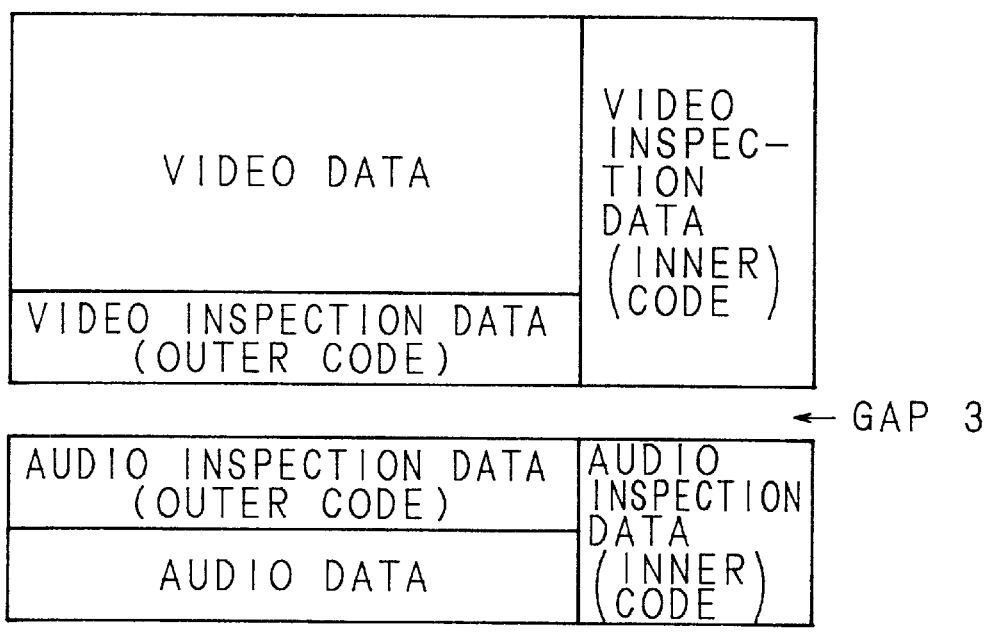

Now, the error-correcting code for data to be recorded on a magnetic tape will be explained using FIG. 12. FIG. 12 (a) shows a configuration of the error-correcting code for video and audio signals during normal recording. The error-correcting code is, in general, frequently- dual-encoded, and in such case, after outer encoding (also called C2 encoding) is performed on each data, inner encoding (also called C1 encoding) is performed. Now, the audio and video data are two-dimensionally arranged in $k_1 \times k_2$ and in $k_1 \times k_3$, respectively. The audio signal is encoded into C1: $(n_1, k_1, d_1)$, C2: $(n_2, k_2, d_2)$, and the video signal is encoded into C1: $(n_1, k_1, d_1)$, C2: $(n_3, k_3, d_3)$, where n is a code length, k is an information length, and d is a distance between codes. The encoded data is scanned from the lower left to the right in FIG. 12 (a) and forms a track by repeating this operation $n_2+n_3$ times. In FIG. 10, outer encoded area is shown as inspection data. On the INDEX signal, similar error-correcting coding is performed (not, shown). As shown in FIG. 12 (a), because no gap is provided between audio inspection data (outer code) and video inspection data (outer code), the length of the inspection( code can be increased by the gap length, and thus, the error-correcting capability can be improved.

The audio data for post-scoring is error-correcting-encoded as in normal recording. At the track in FIG. 10, audio data and audio inspection data are rewritten. The rewriting timing is determined by estimating from the timing to reproduce ATF and INDFX signals and obtaining the recording mode. Consequently, positioning is performed properly but not accurately, and part of the video inspection data may he impaired. However, because for normal video data, a strong error-correcting code is used, errors of only one or two inner codes may occur, almost all of such errors can be corrected. Even if correction is impossible, errors are occurred in the inspection data and video data is scarcely affected.

(Fourth Embodiment)

Figure 11:
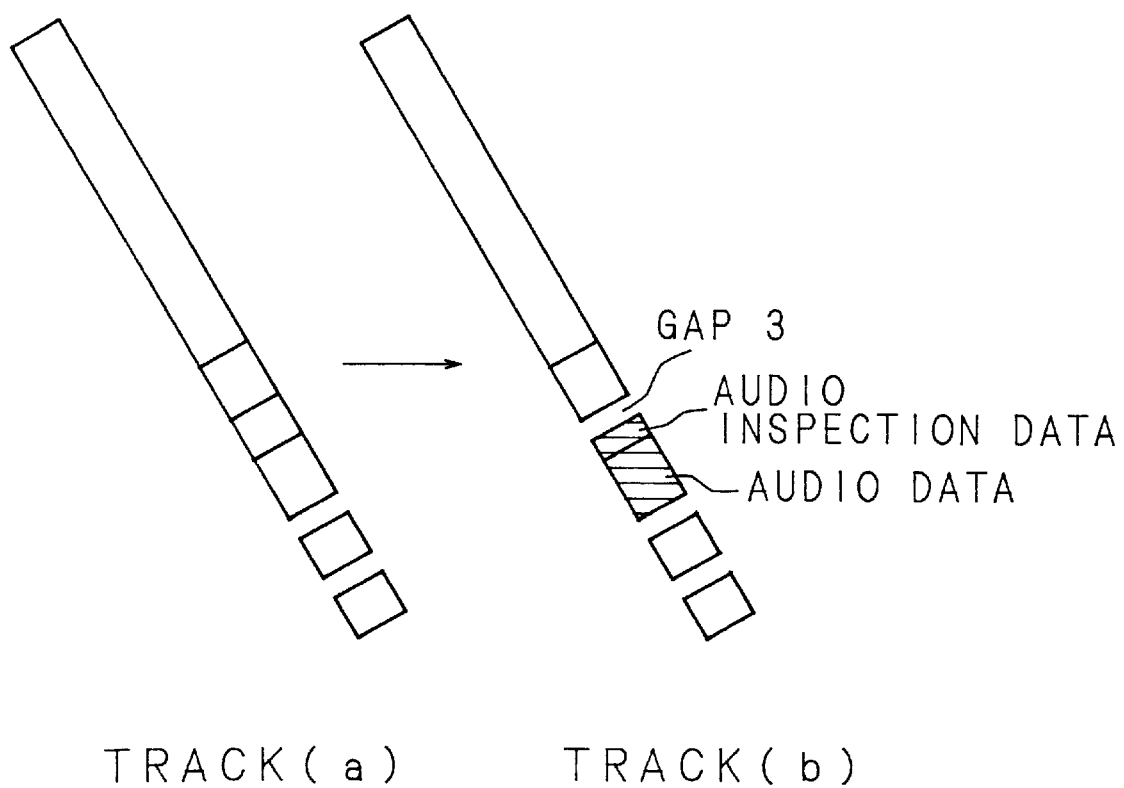
FIG. 11 is a diagram showing another tape format of a digital VTR according to the present invention.

Using a track pattern diagram in FIG. 11, the fourth embodiment will be explained. The track (a) in FIG. 11 shows a track pattern during normal recording and is the same as that in FIG. 10. When post-scoring audio recording is carried out, a gap 3 is created by shortening the code length of the audio signal as shown in the track (b). That, is, as shown in FIG. 12 (b), by shortening the code length of the outer code (C2) gap 3 can be produced. In this case, the correcting capability for the audio data is lowered but no video data is damaged. The gap 3 exists in the same manner as in conventional embodiments and the same correcting capability is obtained for the audio signal. Because almost all portions to be post-scored are usually a part of the recorded signal, the remaining part of the audio data can be stored with high correcting capability ensured. In addition, if post-scoring audio signal is not normally reproduced, post-scoring can be done over again.

Information that the post-scoring code length is changed should be stored in the very place after synchronizing and ID signals are added, when, for example, one of C1 codes in FIG. 12 (a) are formed as an ID signal. In FIG. 5, this ID signal is detected and processing of audio signal can be performed at the post-scoring audio reproducing signal processor 22.

When the code length for audio signal is varied, by shortening the code length the gap 3 can be produced and it is convenient but conversely, by increasing the code length it is also possible to improve the error-correcting capability. This is effective when the error rate during post-scoring audio recording is higher than that during normal recording.

(Fifth Embodiment)

Using a track pattern diagram in FIG. 13, the fifth embodiment will be explained. In the track (a) in FIG. 13, the audio signal and INDEX signal are error-correcting-encoded in a lump. This brings a condition in which gap 2 is not present. Now, the case in which the INDEX signal is post-scored is considered. As in the case of the track (b) in FIG. 13, by recording the INDEX signal of shortened code length the sap 2 can be produced. In this case, the audio signal in the back is not affected at all. The INDEX signal is rewritten when, for example, the retrieval signal is (Sixth Embodiment)

Figure 14:
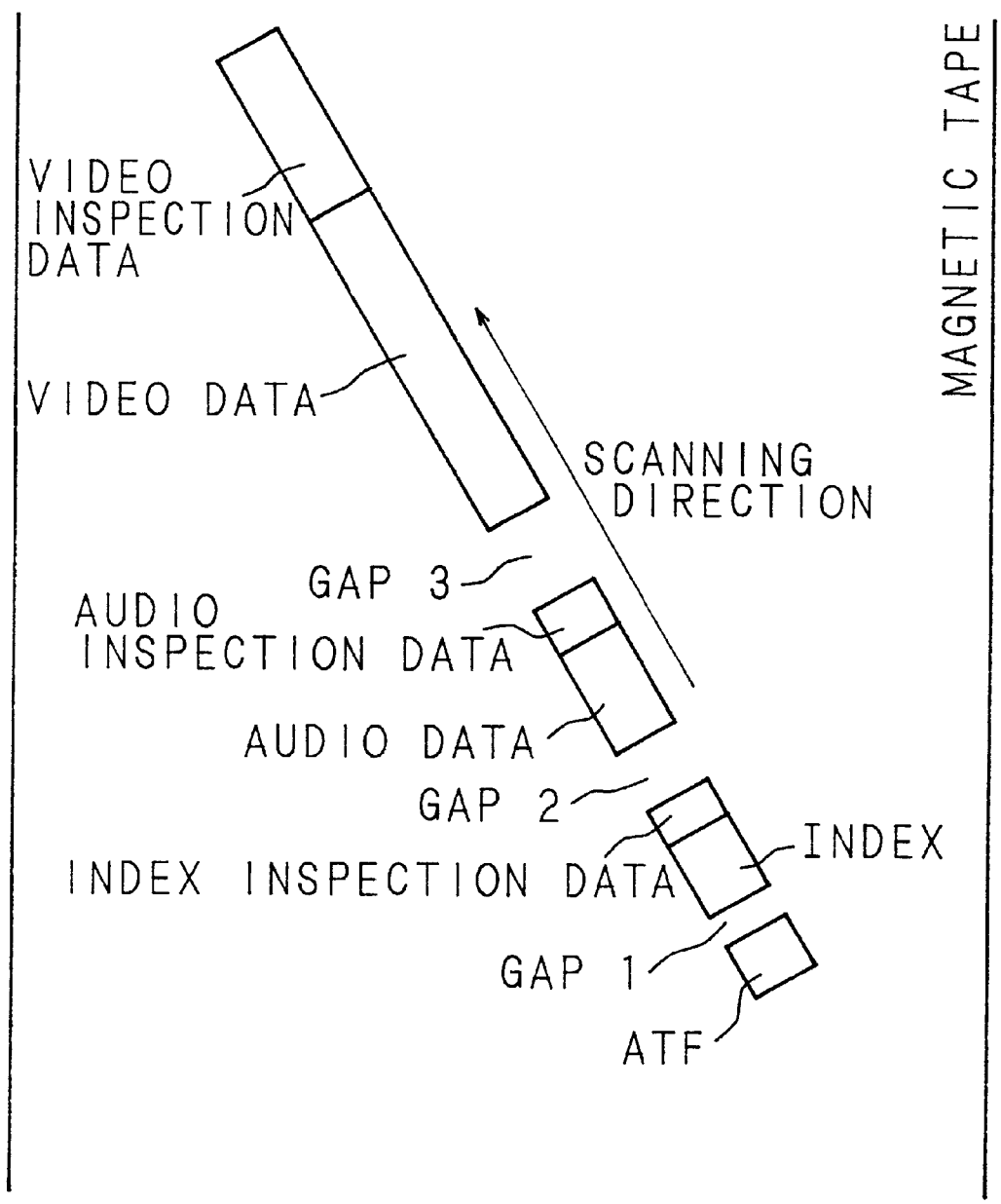
FIG. 14 is a diagram showing a further tape format of a digital VTR during normal recording according to the present invention.
Figure 15:
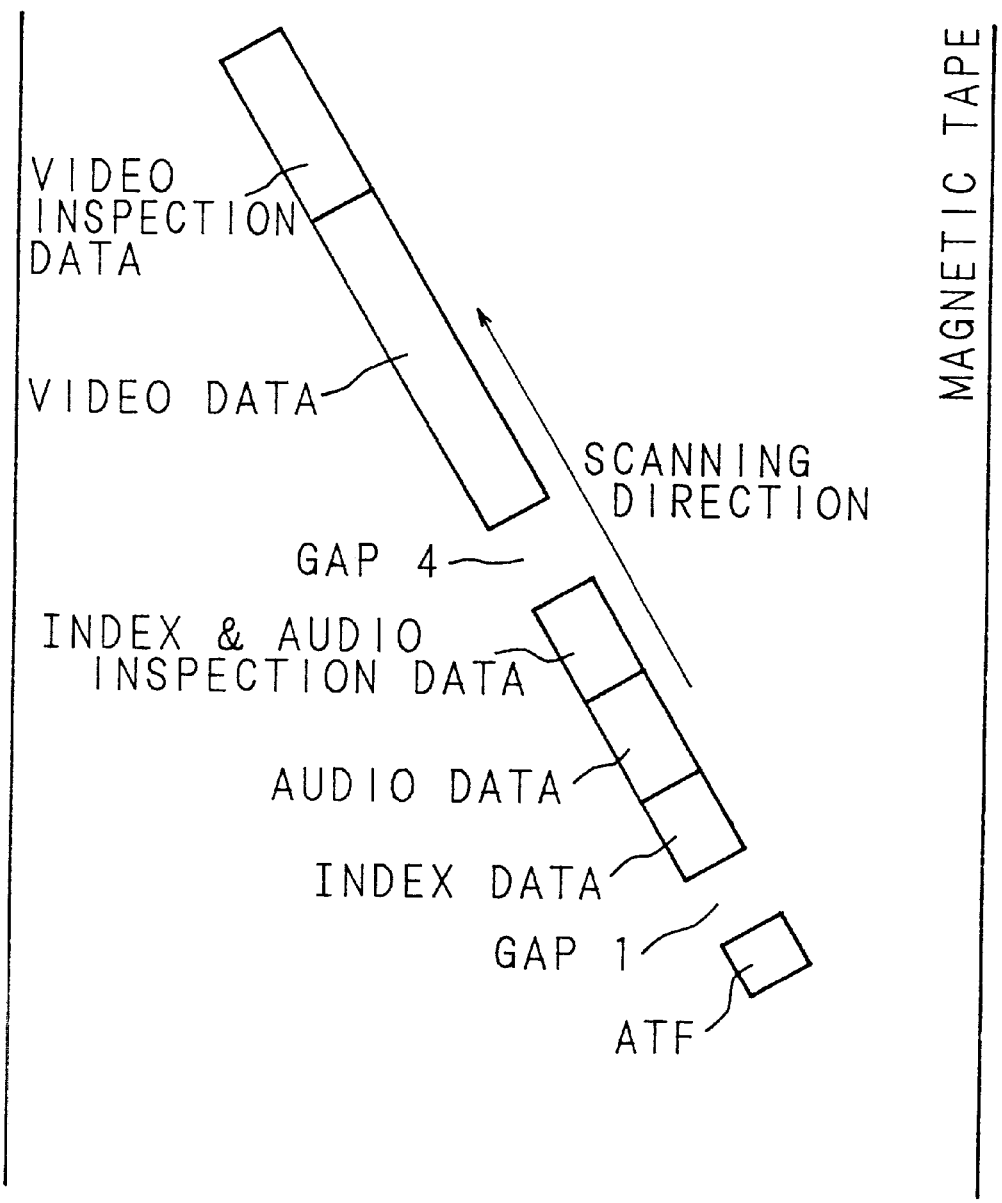
FIG. 15 is a diagram showing still further tape format of a digital VTR during post-scoring audio recording according to the present invention.
Figure 16:
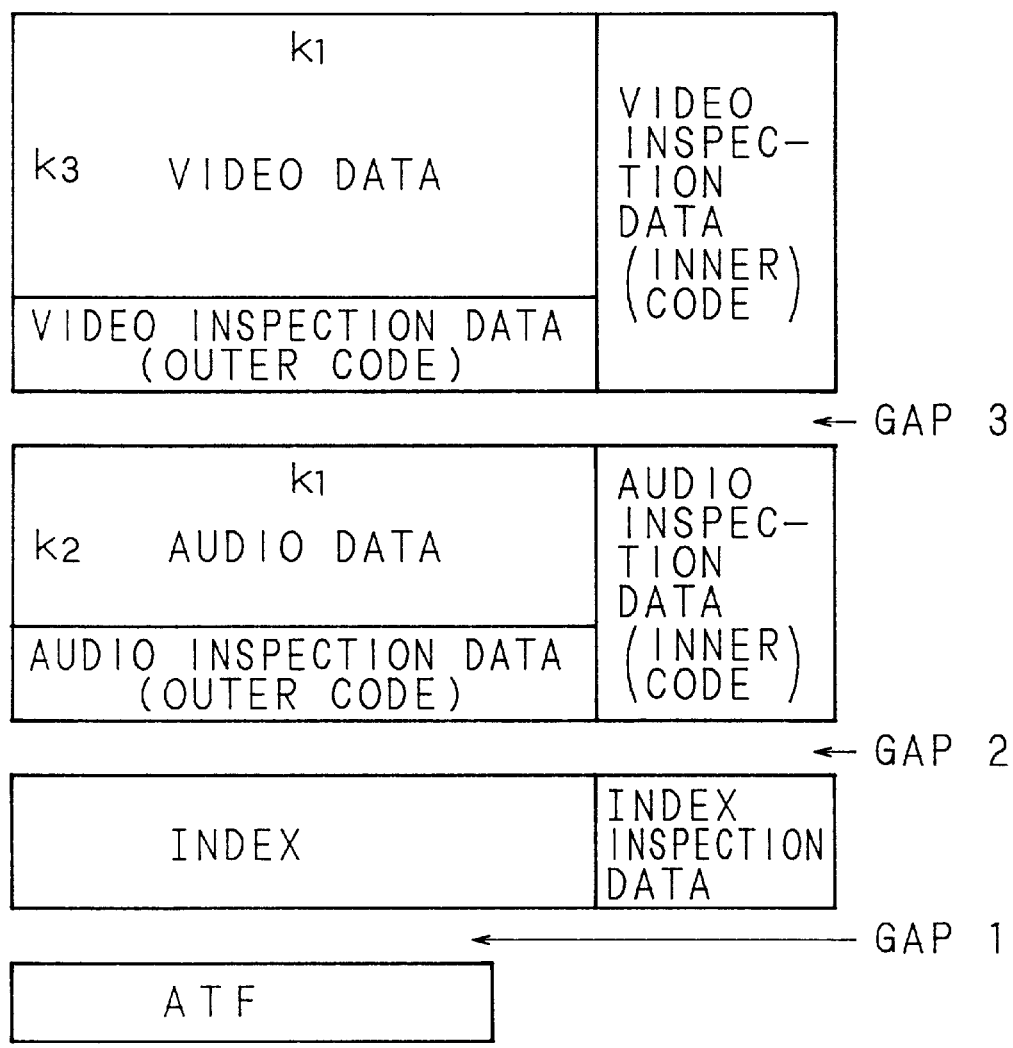
FIG. 16 is a diagram showing another error-correcting code format of a digital VTR during normal recording according to the present invention.
Figure 17:
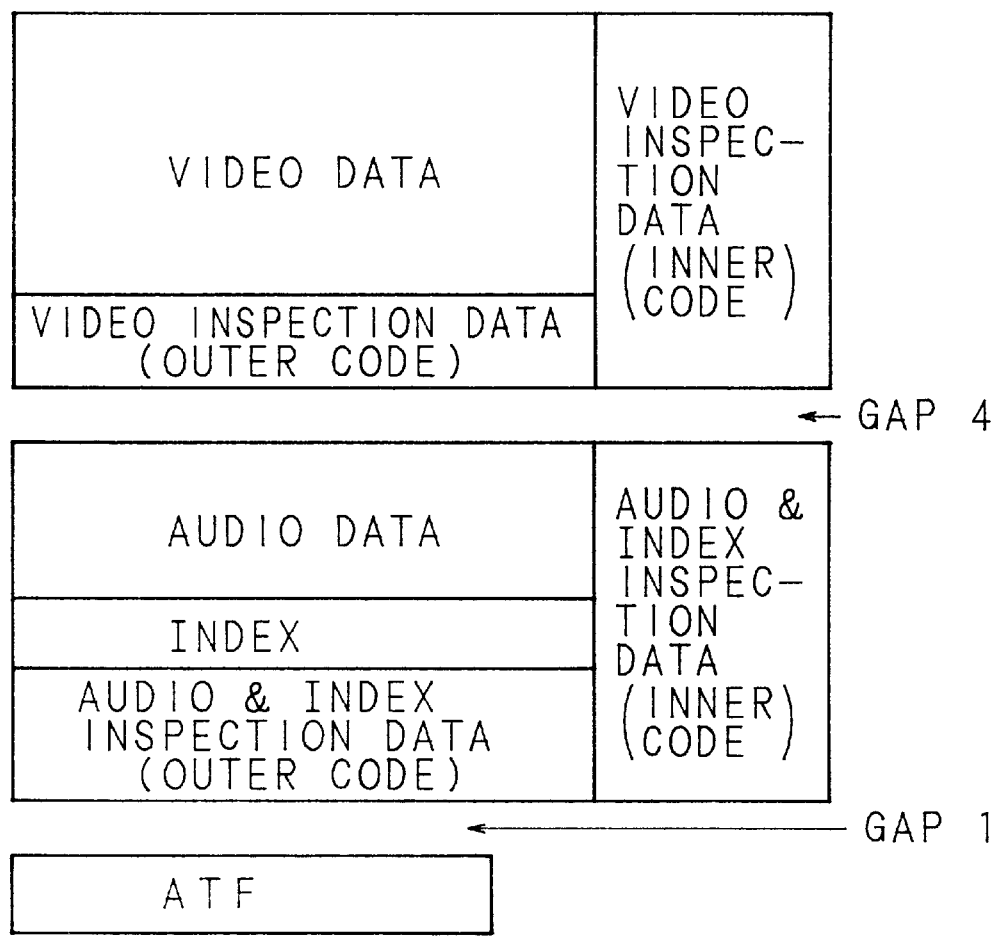
FIG. 17 is a diagram showing another error-correcting code format of a digital VTR during post-scoring audio recording according to the present invention.

FIG. 14 shows a track format on a magnetic tape during normal recording according to the sixth embodiment and FIG. 15 shows a track format on a magnetic tape during post-scoring audio recording. FIG. 16 shows an error-correcting code format during normal recording according to the sixth embodiment and FIG. 17 shows an error-correcting code format during post-scoring audio recording. In the system used in the sixth embodiment as shown in FIGS. 14, 16, four areas are provided during normal recording, in which the ATF signal, the special recording area signals for INDEX signal, the audio signal, and the video signal are digitally recorded in that order in the head scanning direction. Between the ATF area and INDEX area and the audio area and video area, gaps 1, 2, 3 are provided respectively. On the other hand, during post-scoring audio recording as shown in FIGS. 15, 17, the inner-code and outer-code inspection data are added to the INDEX signal and audio signal in a lump, and gaps 1, 4 are provided between the ATF and INDEX areas and the audio and video areas, respectively, reducing the gap by one compared to normal recording. Thus, adjustment of timing difference caused by post-scoring is effected.

(Seventh Embodiment)

Figure 18:
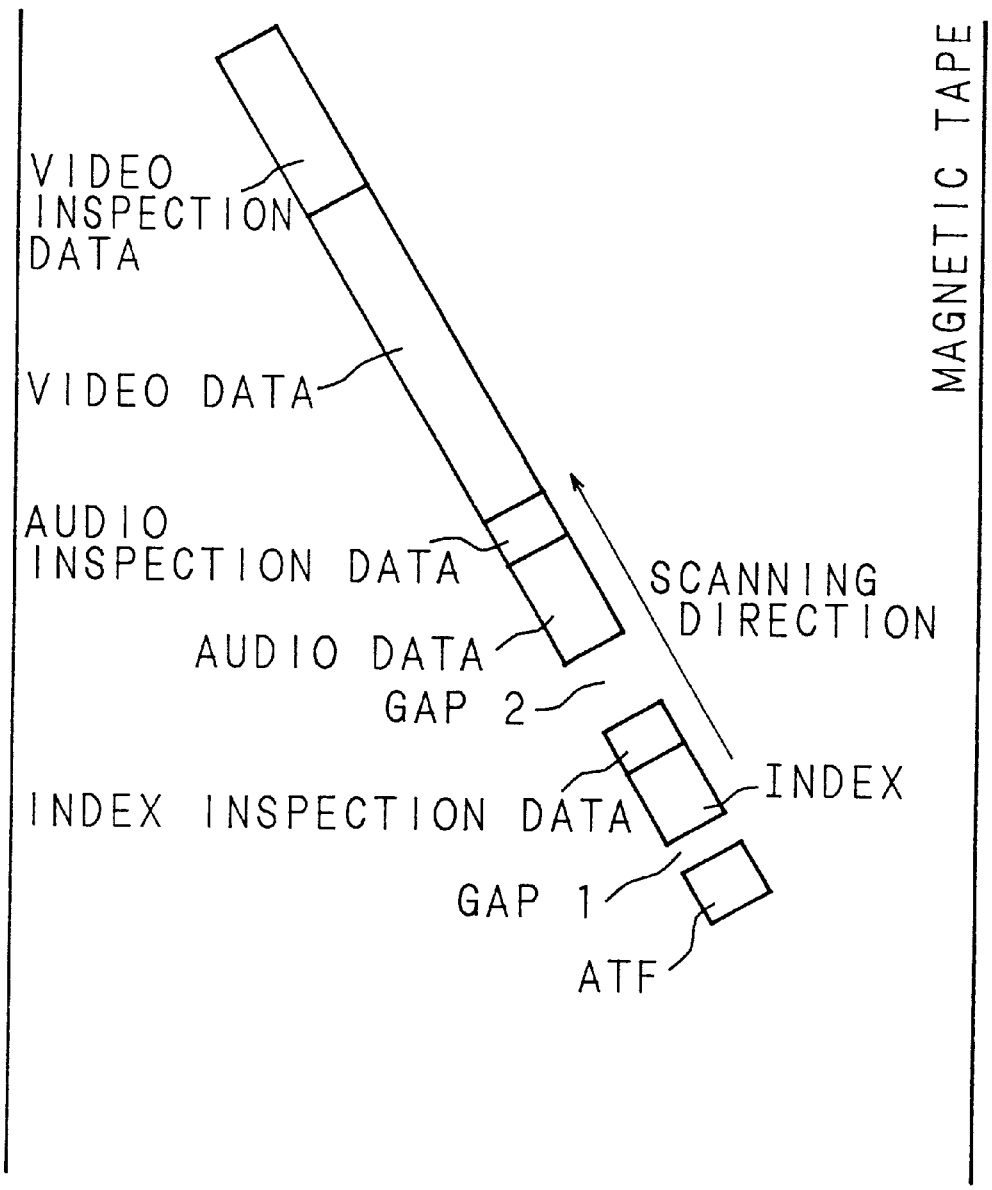
FIG. 18 is a diagram showing another tape format of a digital VTR during normal recording according to the present invention.
Figure 19:
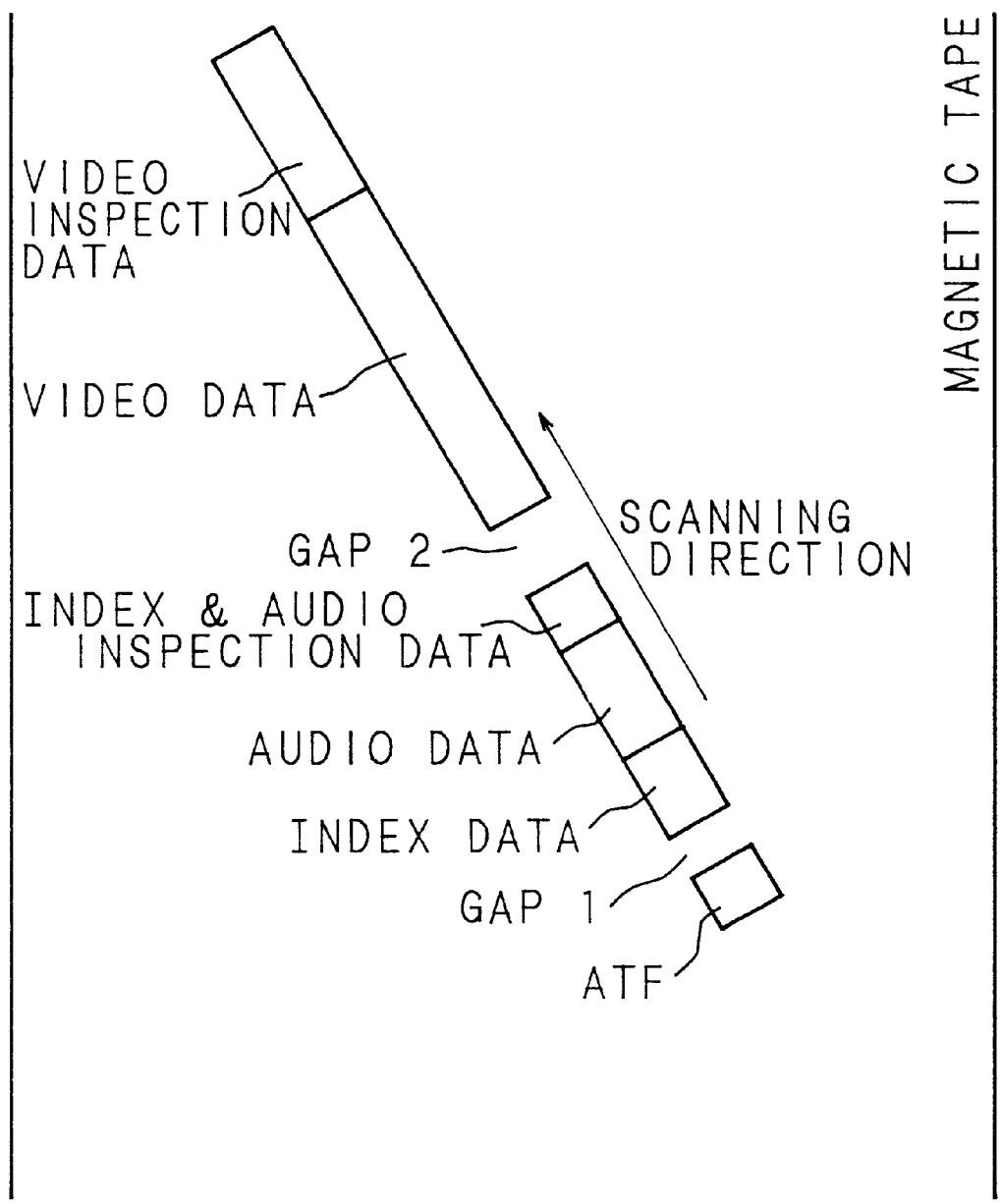
FIG. 19 is a diagram showing still another tape format of a digital post-scoring audio recording VTR according to the present invention.
Figure 20:
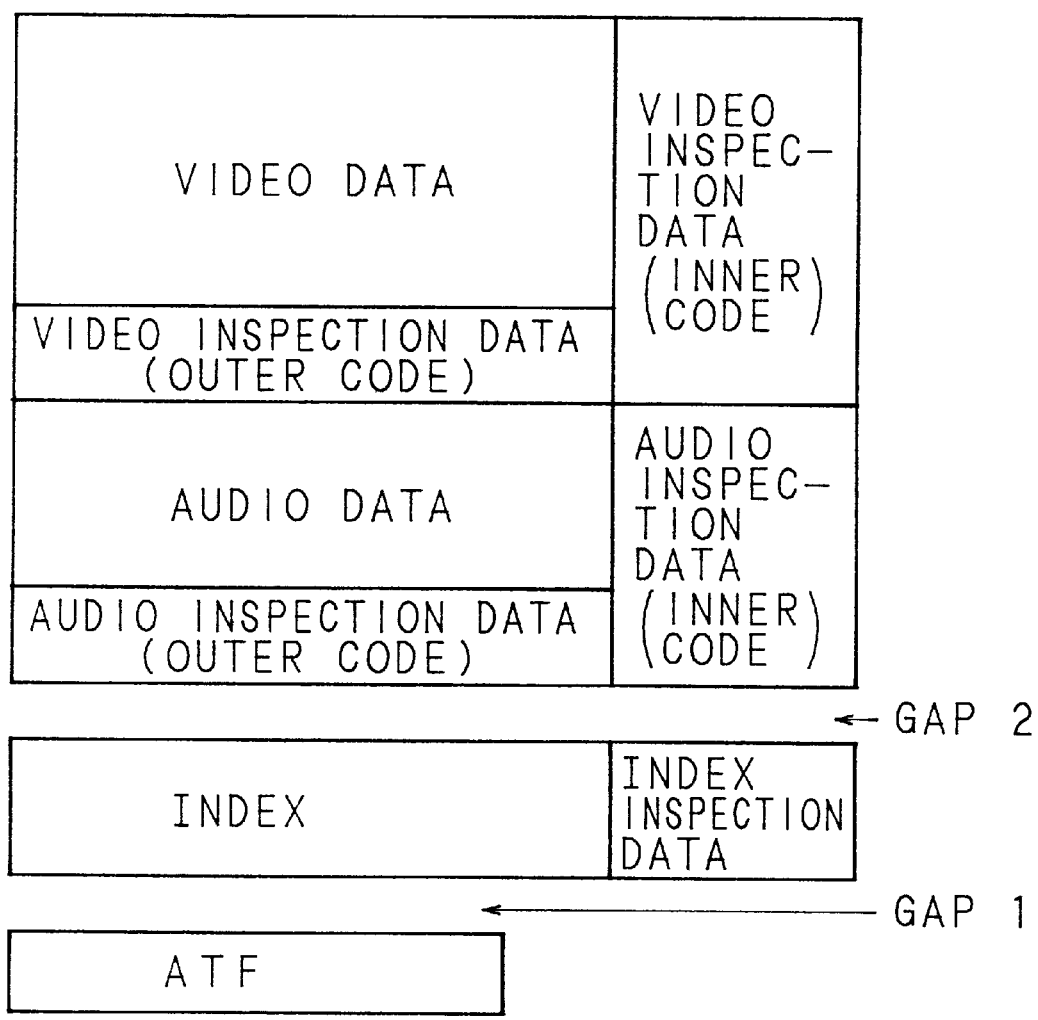
FIG. 20 is a diagram showing still another error-correcting code format of a digital VTR during normal recording according to the present invention.
Figure 21:
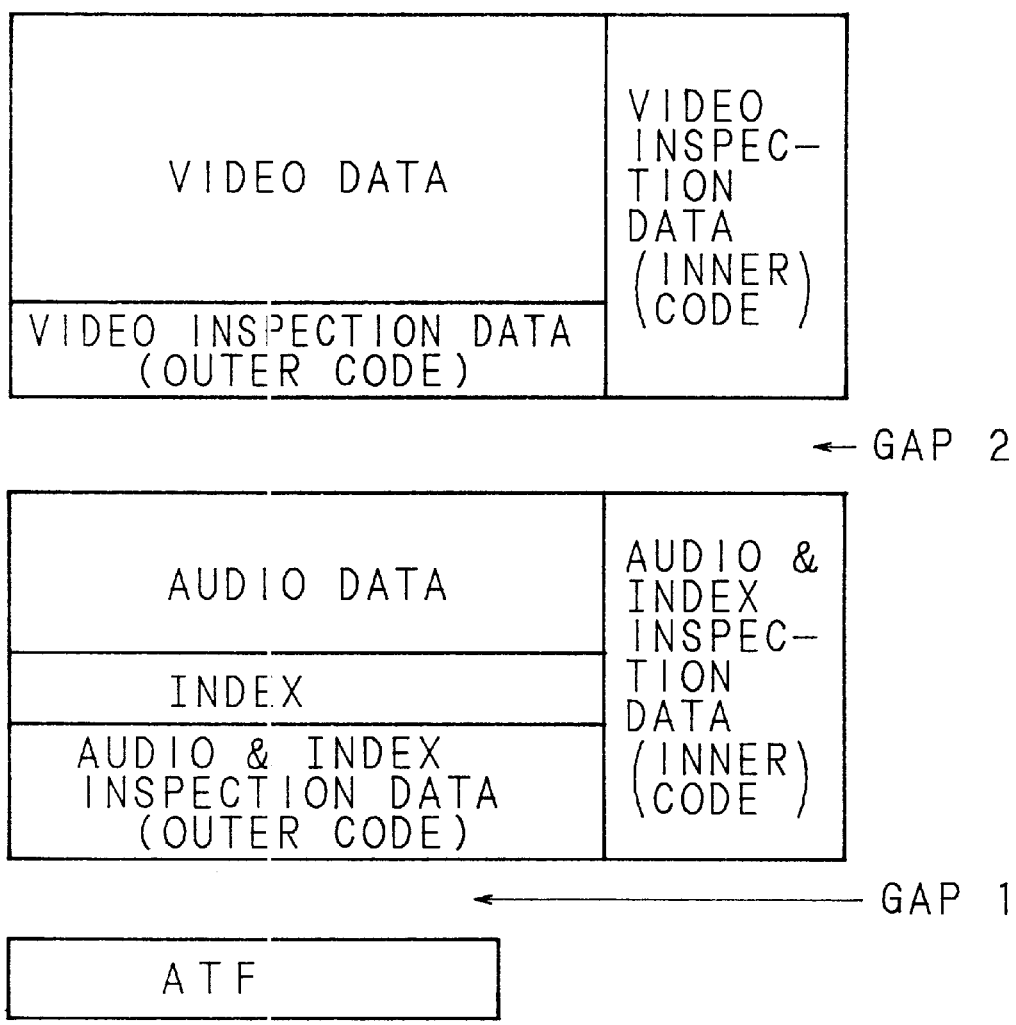
FIG. 21 is a diagram showing another error-correcting code format of a digital VTR during post-scoring audio recording according to the present invention.

FIG. 18 shows a track format on a magnetic tape according to the seventh embodiment during normal recording, and FIG. 19 shows a track format on a magnetic tape during post-scoring audio recording. FIG. 20 shows an error-correcting code format according to the seventh embodiment during normal recording, and FIG. 21 shows an error-correcting code format during post-scoring audio recording. During normal recording as shown in FIGS. 18, 20, the audio signal and video signal are error-correcting-encoded in a lump. In this case, there is no gap between audio and video signals. Now, consideration is given to the case in which the audio signal is post-scored. As shown in FIGS. 19, 21, by recording INDEX and audio signals in a lump a gap can be produced. In this case, the video signal in the back in not affected at all.

In the above third through seventh embodiments, process is explained with video, audio, and INDEX signals as examples, but the same explanation will be applied to any data if they are related to one another.

In each embodiment, two-channel audio signal for normal recording and two-channel audio signal for post-scoring are designed to be recorded without audio-compression, but they may be audio-compressed and recorded and they are not necessarily two-channel signals.

In each embodiment, the input video signal is designed to be quantized to an 8-hit digital signal at quadruple sub-carrier frequency (14.318 MHz) at the A/D converter, but it, may be a 4:2:2 component video signal as seen in CCIR Rec601.

In each embodiment, the input audio signal is designed to be converted into a 16-bit digitized signal with sampling frequency of 48 kHz at the A/D converter, but it may be so configured to be converted, for example, to a 12-bit digitized signal with sampling frequency of 32 kHz, or to a 16-bit digitized signal with sampling frequency of 44.1 kHz.

In each embodiment, a part of video signal to be extracted is explained using a high-frequency component but needless to say, it may be a low-frequency component, DC component, data for motion compensation, or data for editing or special reproduction.

As this invention may be embodied in several forms without departing from the spirit of essential characteristics thereof, the present embodiment is therefore illustrative and note restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed:

1. A digital signal recording and reproducing method for digitally recording and reproducing first and second signals in tracks on a magnetic recording medium, comprising:
    (a) separately error-correcting encoding said first and second signals of a first and second type, respectively, to produce at least first and second inspection codes corresponding to said first and second signals, said first and second inspection codes having first and second lengths, respectively; and
    (b) recording said first and second signals and said first and second inspection codes in tracks of said magnetic recording medium so that said first and second signals and said first and second inspection codes are recorded in a track without a gap therebetween, said first inspection code forming a buffer between said first and second signals which protects said first signal from influence of deviated recording during an operation in which only said second signal and said second inspection code are overwritten in said track.

2. The digital signal recording and reproducing method of claim 1, wherein said first signal is a video signal and said second signal is an audio signal.

3. The digital signal recording and reproducing method of claim 1, wherein said first signal is an audio signal and said second signal is a subcode signal.

4. The digital signal recording and reproducing method of claim 1, wherein said step (b) sequentially records said first signal, said first inspection code, said second inspection code, and said second signal.

5. The digital signal recording and reproducing method of claim 1, wherein said step (b) sequentially records said first inspection code, said first signal, said second inspection code, and said second signal.

6. The digital signal recording and reproducing method of claim 5, further comprising:
    (c) error-correcting encoding a third signal of said first type to produce a third inspection code corresponding to said third signal, said third inspection code having a third length; and
    (d) recording said third signal and said third inspection code in tracks of said recording medium over said first signal and said first inspection code to rewrite said first signal and said first inspection code.

7. The digital signal recording and reproducing method of claim 6, wherein said first and third signals are audio signals and said second signal is a subcode signal.

8. The digital signal recording and reproducing method of claim 6, wherein said third length is less than said first length such that step (d) creates a gap in at least one track between said third signal and said second inspection code.

9. The digital signal recording and reproducing method of claim 8, wherein said first and third signals are audio signals and said second signal is a subcode signal.

10. The digital signal recording and reproducing method of claim 8, wherein said second signal includes information on at least one of said first and third signals.

11. The digital signal recording and reproducing method of claim 6, wherein said second signal includes information on at least one of said first and third signals.

12. The digital signal recording and reproducing method of claim 1, further comprising:
    (c) error-correcting encoding a third signal of said second type to produce a third inspection code corresponding to said third signal, said third inspection code having a third length; and
    (d) recording said third signal and said third inspection code in tracks of said recording medium over said second signal and said second inspection code to rewrite said second signal and said second inspection code.

13. The digital signal recording and reproducing method of claim 12, wherein said step (d) records said third signal and said third inspection code such that a gap is formed on at least one track.

14. The digital signal recording and reproducing method of claim 13, wherein said steps (b) and (d) record said first, second and third signals and said first, second and third inspection codes such that said gap is formed between said first inspection code and said third inspection code.

15. The digital signal recording and reproducing method of claim 14, wherein said step (b) sequentially records said first signal, said first inspection code, said second inspection code, and said second signal.

16. The digital signal recording and reproducing method of claim 15, wherein said third length is less than said second length such that said step (d) creates said gap between said first and third inspection codes.

17. The digital signal recording and reproducing method of claim 13, wherein said steps (b) and (d) record said first, second and third signals and said first, second and third inspection codes such that said gap is formed between said third signal and said first inspection code.

18. The digital signal recording and reproducing method of claim 17, wherein said step (b) sequentially records said second inspection code, said second signal, said first inspection code, and said first signal.

19. The digital signal recording and reproducing apparatus of claim 18, wherein said third length is less than said second length such that said step (d) creates said gap between said third signal and said second inspection code.

20. The digital signal recording and reproducing method of claim 1, wherein said step (b) records said first and second signals and said first and second inspection codes such that said first inspection code is arranged between said first signal and one of said second signal and said second inspection code.

21. A digital signal recording and reproducing apparatus for digitally recording and reproducing first and second signals in tracks on a magnetic recording medium, comprising:

encoding means for separately error-correcting encoding said first and second signals of a first and second type, respectively, to produce at least first and second inspection codes corresponding to said first and second signals, said first and second inspection codes having first and second lengths, respectively; and
    recording means for recording said first and second signals and said first and second inspection codes in tracks of said magnetic recording medium so that said first and second signals and said first and second inspection codes are recorded in a track without a gap therebetween, said first inspection code forming a buffer between said first and second signals which protects said first signal from influence of deviated recording during an operation in which only said second signal and said second inspection code are overwritten in said track.

22. The digital signal recording and reproducing apparatus of claim 21, wherein said first signal is a video signal and said second signal is an audio signal.

23. The digital signal recording and reproducing apparatus of claim 21, wherein said first signal is an audio signal and said second signal is a subcode signal.

24. The digital signal recording and reproducing apparatus of claim 21, wherein said recording means sequentially records said first signal, said first inspection code, said second inspection code, and said second signal.

25. The digital signal recording and reproducing apparatus of claim 21, wherein said recording means said first inspect said first inspection code, said first signal, said second inspection code, and said second signal.

26. The digital signal recording and reproducing apparatus of claim 25, wherein
said encoding means error-correcting encodes a third signal of said first type to produce a third inspection code corresponding to said third signal, said third inspection code having a third length; and
said recording means records said third signal and said third inspection code in tracks of said recording medium over said first signal and said first inspection code to rewrite said first signal and said first inspection code.

27. The digital signal recording and reproducing apparatus of claim 26, wherein said first and third signals are audio signals and said second signal is a subcode signal.

28. The digital signal recording and reproducing apparatus of claim 26, wherein said third length is less than said first length such that said recording means creates a gap in at least one track between said third signal and said second inspection code.

29. The digital signal recording and reproducing apparatus of claim 28, wherein said first and third signals are audio signals and said second signal is a subcode signal.

30. The digital signal recording and reproducing apparatus of claim 29, wherein said second signal includes information on at least one of said first and third signals.

31. The digital signal recording and reproducing apparatus of claim 26, wherein said second signal includes information on at least one of said first and third signals.

32. The digital signal recording and reproducing apparatus of claim 21, wherein said recording means records said first and second signals and said first and second inspection codes such that said first inspection code is arranged between said first signal and one of said second signal and said second inspection code.

33. The digital signal recording and reproducing apparatus of claim 21, wherein
said encoding means error-correcting encodes a third signal of said second type to produce a third inspection code corresponding to said third signal, said third inspection code having a third length; and
said recording means records said third signal and said third inspection code in tracks of said recording medium over said second signal and said second inspection code to rewrite said second signal and said second inspection code.

34. The digital signal recording and reproducing apparatus of claim 33, wherein said recording means records said third signal and said third inspection code such that a gap is formed on at least one track.

35. The digital signal recording and reproducing apparatus of claim 34, wherein said recording means records said first, second and third signals and said first, second and third inspection codes such that said gap is formed between said first inspection code and said third inspection code.

36. The digital signal recording and reproducing apparatus of claim 35, wherein said recording means sequentially records said first signal, said first inspection code, said second inspection code, and said second signal.

37. The digital signal recording and reproducing apparatus of claim 36, wherein said third length is less than said second length such that said recording means creates said gap between said first and third inspection codes.

38. The digital signal recording and reproducing apparatus of claim 34, wherein said recording means records said first, second and third signals and said first, second and third inspection codes such that said gap is formed between said third signal and said first inspection code.

39. The digital signal recording and reproducing apparatus of claim 38, wherein said recording means sequentially records said second inspection code, said second signal, said first inspection code, and said first signal.

40. The digital signal recording and reproducing apparatus of claim 39, wherein said third length is less than said second length such that said recording means creates said gap between said third signal and said second inspection code.

41. A digital recording and reproducing method for digitally recording and reproducing first and second signals in tracks on a magnetic recording medium, comprising:
(a) error-correcting encoding video and audio signals to produce inspection codes; and
(b) recording said video and audio signals and said inspection codes in tracks of said magnetic recording medium so that said video and audio signals and said inspection codes are recorded in a track without a gap therebetween, said inspection code produced from said video signal forming a buffer between said audio and video signals which protects said video signal from influence of deviated recording during an operation in which only said audio signal and said inspection code produced from said audio signal are overwritten in said track.

42. The digital signal recording and reproducing method of claim 41, wherein said step (b) records said video and audio signals and said inspection codes such that said inspection code for said video signal is arranged between said video signal and one of said audio signal and said inspection code for said audio signal.

43. A digital signal recording and reproducing method for digitally recording and reproducing first and second signals in tracks on a magnetic recording medium, comprising:
(a) separately error-correcting encoding said first and second signals of a first and second type, respectively, to produce at least first and second inspection codes corresponding to said first and second signals, said first and second inspection codes having first and second lengths, respectively;
(b) sequentially recording said first signal, said first inspection code, said second inspection code, and said second signal in tracks of said magnetic recording medium so that said first and second signals and said first and second inspection codes are recorded in a track without a gap therebetween;
(c) error-correcting encoding a third signal of said second type to produce a third inspection code corresponding to said third signal, said third inspection code having a third length; and (d) recording said third signal and said third inspection code in tracks of said recording medium over said second signal and said second inspection code to rewrite said second signal and said second inspection code.

44. The digital signal recording and reproducing method of claim 43, wherein said first signal is a video signal and said second and third signals are audio signals.

45. The digital signal recording and reproducing method of claim 43, wherein said third length is less than said second length such that step (d) creates a gap in at least one track between said first inspection code and said third inspection code.

46. The digital signal recording and reproducing method of claim 45, wherein said first signal is a video signal and said second and third signals are audio signals.

47. The digital signal recording and reproducing method of claim 45, further comprising the step of (e) recording a fourth signal of a third type in said tracks of said recording medium, said fourth signal including information on said first, second and third signals.

48. The digital signal recording and reproducing method of claim 43, further comprising the step of (e) recording a fourth signal of a third type in said tracks of said recording medium, said fourth signal including information on said first, second and third signals.

49. A digital signal recording and reproducing apparatus for digitally recording and reproducing first and second signals in tracks on a magnetic recording medium, comprising:

encoding means for separately error-correcting encoding said first and second signals of a first and second type, respectively, to produce at least first and second inspection codes corresponding to said first and second signals, said first and second inspection codes having first and second lengths, respectively; and recording means for sequentially recording said first signal, said first inspection code, said second inspection code, and said second signal in tracks of said magnetic recording medium so that said first and second signals and said first and second inspection codes are recorded in a track without a gap therebetween; and wherein said encoding means error-correcting encodes a third signal of said second type to produce a third inspection code corresponding to said third signal, said third inspection code having a third length; and said recording means records said third signal and said third inspection code in tracks of said recording medium over said second signal and said second code to rewrite said second signal and said second code.

50. The digital signal recording and reproducing apparatus of claim 49, wherein said first signal is a video signal and said second and third signals are audio signals.

51. The digital signal recording and reproducing apparatus of claim 49, wherein said third length is less than said second length such that said recording means creates a gap in at least one track between said first inspection code and said third inspection code.

52. The digital signal recording and reproducing apparatus of claim 51, wherein said first signal is a video signal and said second and third signals are audio signals.

53. The digital signal recording and reproducing apparatus of claim 51, wherein said recording means records a fourth signal of a third type in said tracks of said recording medium, said fourth signal including information on said first, second and third signals.

54. The digital signal recording and reproducing apparatus of claim 49, wherein said recording means records a fourth signal of a third type in said,tracks of said recording medium, said fourth signal including information on said first, second and third signals.

* * * * *